United States Patent
Jurca et al.

(10) Patent No.: US 8,843,385 B2
(45) Date of Patent: Sep. 23, 2014

(54) QUALITY OF SERVICE MONITORING OF A SERVICE LEVEL AGREEMENT USING A CLIENT BASED REPUTATION MECHANISM ENCOURAGING TRUTHFUL FEEDBACK

(75) Inventors: Radu Jurca, Lausanne (CH); Boi Faltings, Preverenges (CH)

(73) Assignee: Ecole Polytechnique Federale de Lausanne (EPFL), Lausanne (CH)

( * ) Notice: Subject to any disclaimer, the term of this patent is extended or adjusted under 35 U.S.C. 154(b) by 1888 days.

(21) Appl. No.: 11/637,953

(22) Filed: Dec. 11, 2006

(65) Prior Publication Data
US 2008/0137550 A1    Jun. 12, 2008

(51) Int. Cl.
*G06Q 10/00* (2012.01)

(52) U.S. Cl.
USPC ........................................................ 705/7.11

(58) Field of Classification Search
USPC ........................................................ 705/7.11
See application file for complete search history.

(56) References Cited

U.S. PATENT DOCUMENTS

| | | | |
|---|---|---|---|
| 5,765,138 A * | 6/1998 | Aycock et al. | 705/7.23 |
| 6,161,101 A * | 12/2000 | Guinta et al. | 706/45 |
| 6,405,175 B1 * | 6/2002 | Ng | 705/14.26 |
| 6,556,659 B1 * | 4/2003 | Bowman-Amuah | 379/9.04 |
| 6,647,374 B2 * | 11/2003 | Kansal | 705/37 |
| 6,751,650 B1 * | 6/2004 | Finch et al. | 709/203 |
| 6,892,178 B1 * | 5/2005 | Zacharia | 705/7.29 |
| 6,892,179 B1 * | 5/2005 | Zacharia | 705/4 |
| 6,895,385 B1 * | 5/2005 | Zacharia et al. | 705/7.29 |
| 6,963,849 B1 * | 11/2005 | Chaturvedi et al. | 705/7.29 |
| 7,284,204 B2 * | 10/2007 | Lee | 715/764 |
| 7,313,533 B2 * | 12/2007 | Chang et al. | 705/7.38 |
| 7,406,436 B1 * | 7/2008 | Reisman | 705/7.32 |
| 7,519,562 B1 * | 4/2009 | Vander Mey et al. | 705/500 |
| 7,739,153 B1 * | 6/2010 | Anderson et al. | 705/26.64 |
| 7,870,014 B2 * | 1/2011 | Baughn et al. | 705/7.14 |
| 7,899,403 B2 * | 3/2011 | Aaron | 455/67.11 |
| 8,112,515 B2 * | 2/2012 | Ala-Kleemola et al. | 709/224 |
| 8,170,979 B2 * | 5/2012 | Rinearson | 706/60 |
| 8,239,228 B2 * | 8/2012 | Bechtel et al. | 705/7.11 |
| 8,271,526 B2 * | 9/2012 | Farr et al. | 707/783 |
| 8,538,833 B2 * | 9/2013 | Dance et al. | 705/26.7 |
| 2002/0072953 A1 * | 6/2002 | Michlowitz et al. | 705/10 |
| 2002/0099579 A1 * | 7/2002 | Stowell et al. | 705/7 |
| 2002/0193066 A1 * | 12/2002 | Connelly | 455/2.01 |
| 2003/0050804 A1 * | 3/2003 | Hendershot | 705/4 |
| 2003/0055723 A1 * | 3/2003 | English | 705/14 |
| 2003/0097296 A1 * | 5/2003 | Putt | 705/11 |

(Continued)

OTHER PUBLICATIONS

R. Jurca and B. Faltings. "Confess". An Incentive Compatible Reputation Mechanism for the Online Hotel Booking Industry.. Proceedings of the IEEE Conference on E-Commerce, 2004.*

(Continued)

*Primary Examiner* — Scott L Jarrett
(74) *Attorney, Agent, or Firm* — Perkins Coie LLP

(57) ABSTRACT

A computer implemented method is provided for monitoring the quality of service of a service provider, the method comprising the steps of receiving first and second reports from first and second clients, respectively, the first and second reports having information relating to the quality of service provided by the service provider to the first and second clients, respectfully, and estimating the quality of service of the service provider by aggregating the information in the first and second reports and comparing the aggregated information with conditions set forth in an agreement involving the service provider.

10 Claims, 18 Drawing Sheets

(56) References Cited

U.S. PATENT DOCUMENTS

| | | | |
|---|---|---|---|
| 2003/0135481 A1* | 7/2003 | Helmes et al. | 707/1 |
| 2004/0044624 A1* | 3/2004 | Katou et al. | 705/40 |
| 2004/0068431 A1* | 4/2004 | Smith et al. | 705/10 |
| 2004/0122936 A1* | 6/2004 | Mizelle et al. | 709/224 |
| 2004/0193643 A1* | 9/2004 | O'Brien et al. | 707/104.1 |
| 2004/0220852 A1* | 11/2004 | Posey | 705/14 |
| 2004/0220938 A1* | 11/2004 | Posey | 707/100 |
| 2004/0225577 A1* | 11/2004 | Robinson | 705/26 |
| 2005/0010456 A1* | 1/2005 | Chang et al. | 705/7 |
| 2005/0209876 A1* | 9/2005 | Kennis et al. | 705/1 |
| 2005/0283376 A1* | 12/2005 | Miyoshi et al. | 705/1 |
| 2006/0136323 A1* | 6/2006 | Barry et al. | 705/37 |
| 2006/0248007 A1* | 11/2006 | Hofer et al. | 705/40 |
| 2007/0078699 A1* | 4/2007 | Scott et al. | 705/10 |
| 2007/0112671 A1* | 5/2007 | Rowan | 705/39 |
| 2007/0208613 A1* | 9/2007 | Backer | 705/10 |
| 2008/0015925 A1* | 1/2008 | Sundaresan | 705/10 |
| 2008/0109244 A1* | 5/2008 | Gupta | 705/1 |
| 2008/0137550 A1* | 6/2008 | Jurca et al. | 370/252 |
| 2008/0256040 A1* | 10/2008 | Sundaresan et al. | 707/3 |
| 2008/0294637 A1* | 11/2008 | Liu | 707/6 |

OTHER PUBLICATIONS

R. R Jurca and B. Faltings. Towards Incentive-Compatible Reputation Management. Trust, Reputation and Security: Theories and Practice Lecture Notes in AI, vol. 2631, 2003.*

R. Jurca and B. Faltings. "Confess". Eliciting Honest Feedback without Independent Verification Authorities. Agent Mediated Electronic Commerce VI: AAMAS 2004 Workshop, Lecture Notes in CS, vol. 3435, 2004.*

R. Jurca and B. Faltings. Truthful Reputation Information in Electronic Markets without Independent Verification. Technical Report No. ID: IC/2004/08, Swiss Federal Institute of Technology (EPFL), 2004.*

R. Jurca and B. Faltings. Eliciting Truthful Feedback for Binary Reputation Mechanisms. The International Conference on Web Intelligence (WI 2004), Sep. 20-24, 2004.*

R. R Jurca and B. Faltings. Robust Incentive-Compatible Feedback Payments AMEC, 2006.*

R. Jurca and B. Faltings. Using CHI-Scores to Reward Honest Feedback from Repeated Interactions. Proceedings of AAMAS06, May 8-12, 2006.*

R. Jurca and B. Faltings. Minimum Payments that Reward Honest Reputation Feedback. Proceedings of the ACM Conference on Electronic Commerce (EC2006), Jun. 11-15, 2006.*

R. Jurca, B. Faltings and W. Binder, Reliable QoS Monitoring Based on Client Feedback WWW2007, Track: Web Services, ACM May 8-12, 2007.*

R. Jurca and B. Faltings. Obtaining Honest Feedback from Self-Interested Agents Artificial Intelligence Laboratory, Mar. 13-17, 2006.*

R. Jurca and B. Faltings. Enforcing Truthful Strategies in Incentive Compatible Reputation Mechanisms. Internet and Network Economics (WINE 2005), Lecture Notes in Computer Science, vol. 3828, 2005.*

R. Jurca and B. Faltings. Eliminating Undesired Equilibrium Points from Incentive Compatible Reputation Mechanisms . Seventh International Workshop on Agent Mediated Electronic Commerce (AMEC VII 2005), Jul. 25, 2005.*

R. Jurca and B. Faltings. Reputation-based Service Level Agreements for Web Services. In Service Oriented Computing (ICSOC—2005), vol. 3826 of LNCS, 2005.*

Miller, Nolan et al., Eliciting Informative Feedback: The Peer-Prediction Method Jun. 15, 2004.*

Papaioannou, Thanasis G. et al., An Incentives Mechanism Promoting Truthful Feedback in Peer-to-Peer Systems IEEE, 2005.*

Mui, Lik et al., Evaluating Reputation in Multi-agents Systems AAMAS 2002, LNAI 2631, 2003.*

Malaga, Ross A., Web-Based Reputation Management Systems: Problems and Suggested Solutions Electronic Commerce Research, vol. 1, 2001.*

Zacharia, Giorgos et al., Collaborative reputation mechanisms for electronic marketplaces Decision Support Systems, vol. 29, 2000.*

Jurca, Radu et al., Reputation-based Pricing in P2P Services SIGCOMM'05, ACM, Aug. 22-26, 2005.*

Dellarocas, Chrysanthos, Goodwill Hunting: An Economically Efficient Online Feedback Mechanism for Environments with Variable Product Quality, AMEC 2002.*

Teacy, W.T. Luke et al., Coping with Inaccurate Reputation Scores: Experimental Analysis of a Probabilistic Trust Model ACM, AAMAS'05, Jul. 25-29, 2005.*

Dellarocas, Chrysanthos, Mechanisms for coping with unfair ratings and discriminatory behavior in online reputation reporting systems, Proceedings of the twenty first international conference on Information systems, Dec. 2000.*

Patel, Jigar et al., A Probabilistic Trust Model for Handling Iaccurate Reputation Sources iTrust 2005, 2005.*

Weng, Jianshu et al., Protecting Online Rating Systems from Unfair Ratings TrustBus 2005, 2005.*

Jurca, Radu et al., The Price of Truth: Minimum payments that make truth telling rational Ecole Polytechnique Federale De Lausanne, Artificial Intelligence Laboratory, Jul. 2006.*

Jurca, Radu et al., An Incentive Compatible Reputation Mechanism Proceedings of the IEEE International Conference on E-Commerce, CEC'03, 2003.*

Mui, Lik, Computational Models of Trust and Reputation: Agents, Evolutionary Games and Social Networks Massachusetts Institute of Technology, Dec. 20, 2002.*

Miller, Nolan et al., Eliciting Informative Feedback: The Peer-Prediction Method Jan. 26, 2005.*

Jurca, Radu et al., Towards Incentive Compatible Reputation Management in Proceedings of the AAMAS 2002 Workshop on Deception, Fraud and Trust in Agent Societies, 2002.*

Miller, Nolan et al., Eliciting Honest Feedback in Electronic Markets Feb. 11, 2003.*

Deora, Vikas et al., A Quality of Service Management Framework Based on User Expectations ISOC 2003.*

Dellarocas, Chrysanthos, Immunizing Online Reputation Report Systems Against Unfair Raings and Discriminatory Behavior EC'00, ACM, Oct. 17-20, 2000.*

Patel, Jigar et al., A Probabilistic Trust Model for Handling Inaccurate Reputation Sources Proceeding iTrust'05 Proceedings of the Third international conference on Trust Managemen, 2005.*

Andrieux, A., et al., Web Services Agreement Specification, (WS—Agreement), Version Sep. 2005, Grid Resource Allocation Agreement Protocol (GRAAP) WG, of the Computer Area of the Global Grid Forum (GGF), pp. 1-80, Sep. 20, 2009, [http://www.ggforg/Public_Comment_Docs/Documents/Oct-2005/WS-AgreementSpecificationDraft050920.pdf Accessed on May 29, 2014].

* cited by examiner

INCENTIVE-COMPATIBLE PAYMENTS
BASED ON SCORING RULES

INCENTIVE-COMPATIBLE PAYMENTS
BASED ON PARTIAL SOLUTIONS

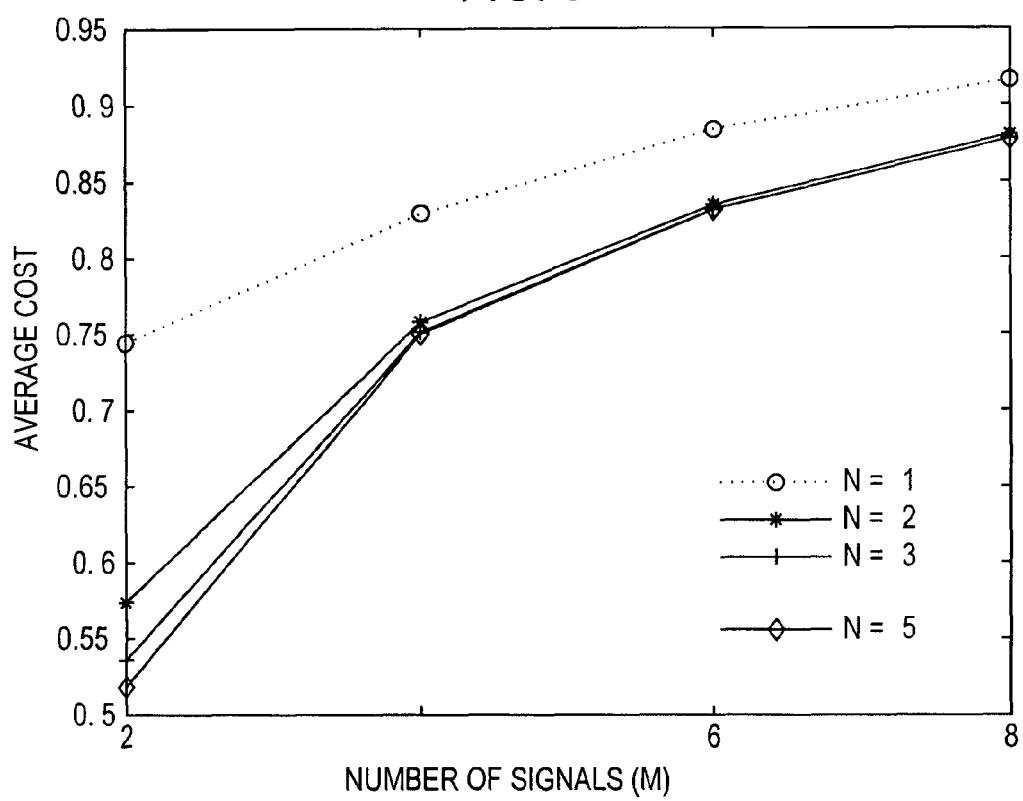
AVERAGE EXPECTED PAYMENT TO ONE AGENT
WHEN SEVERAL REPORTS ARE USED

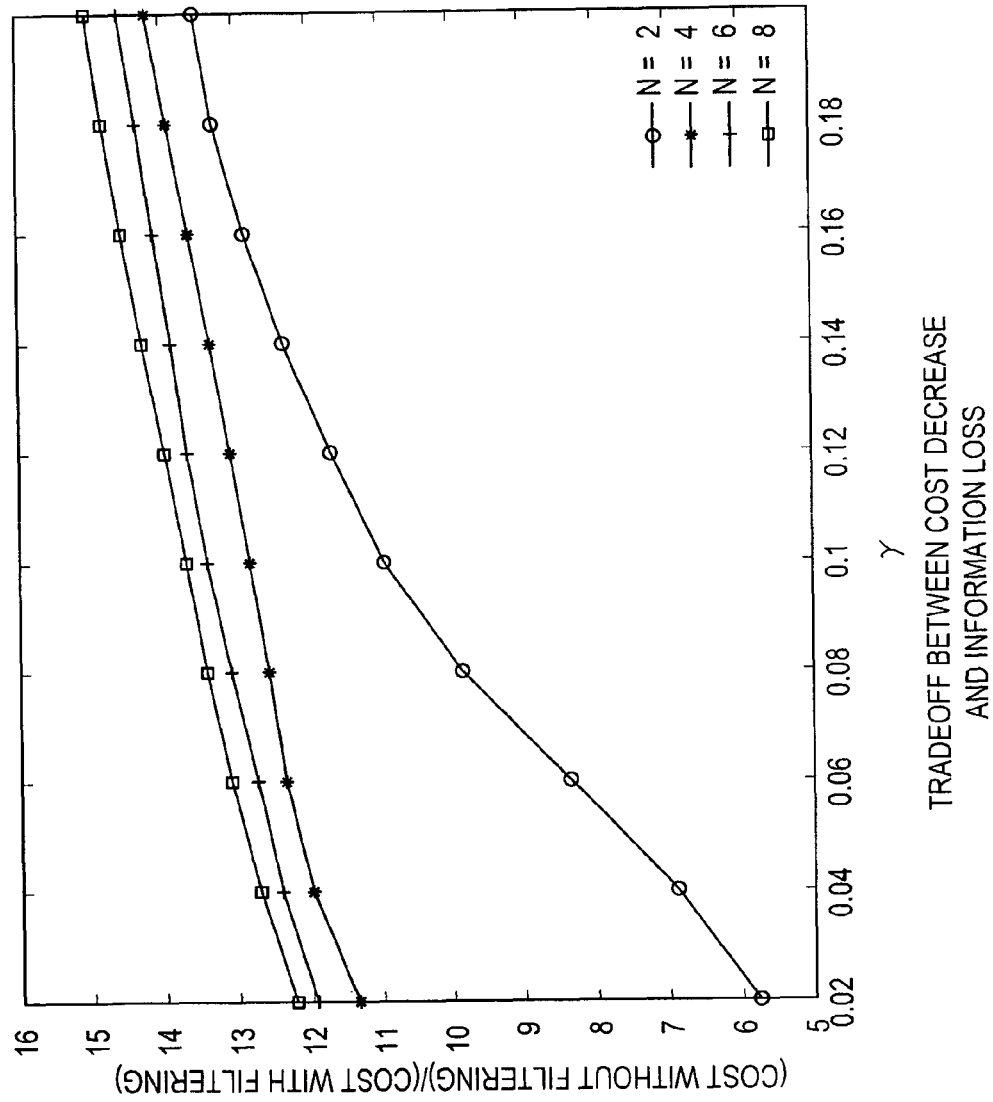

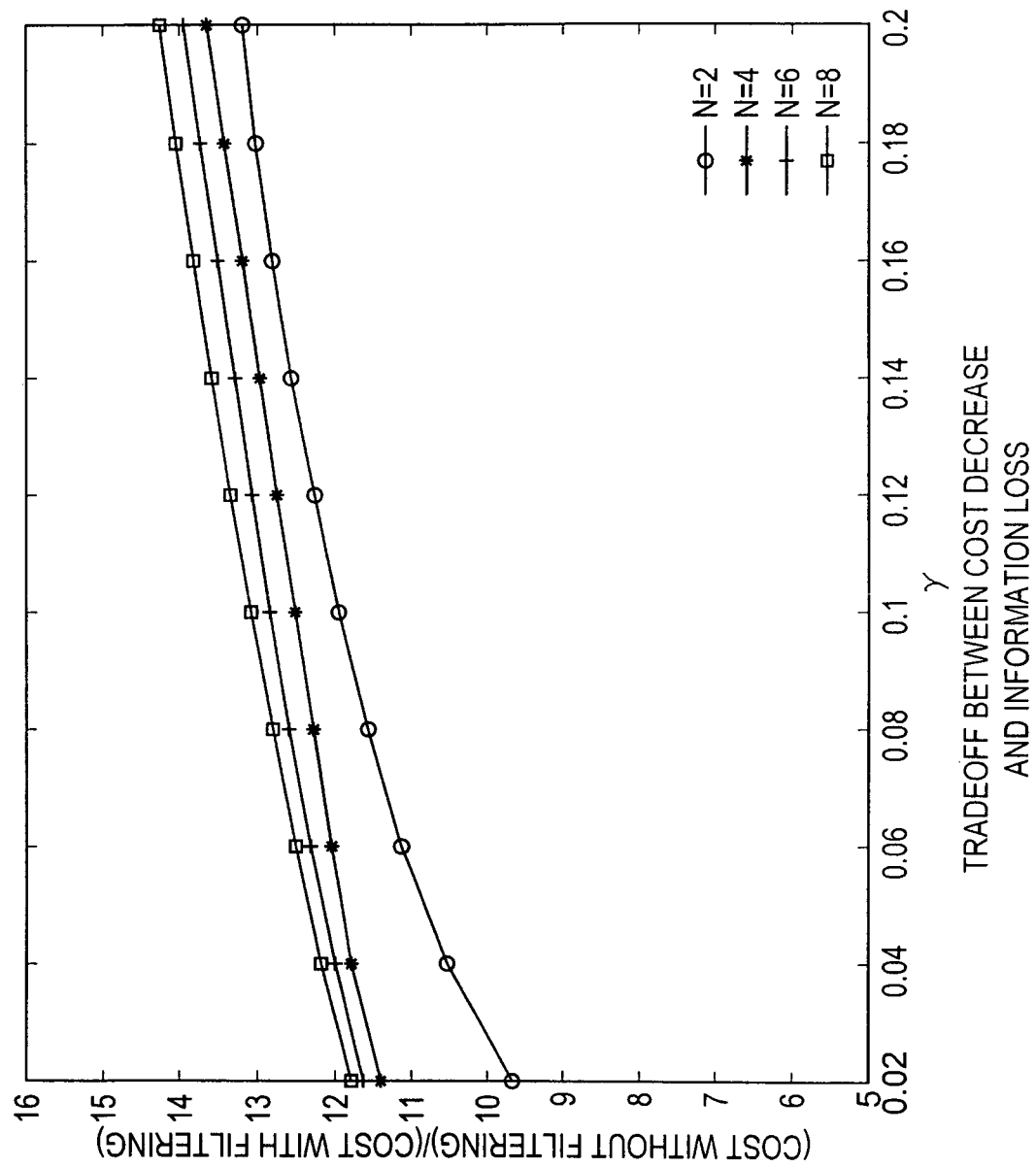

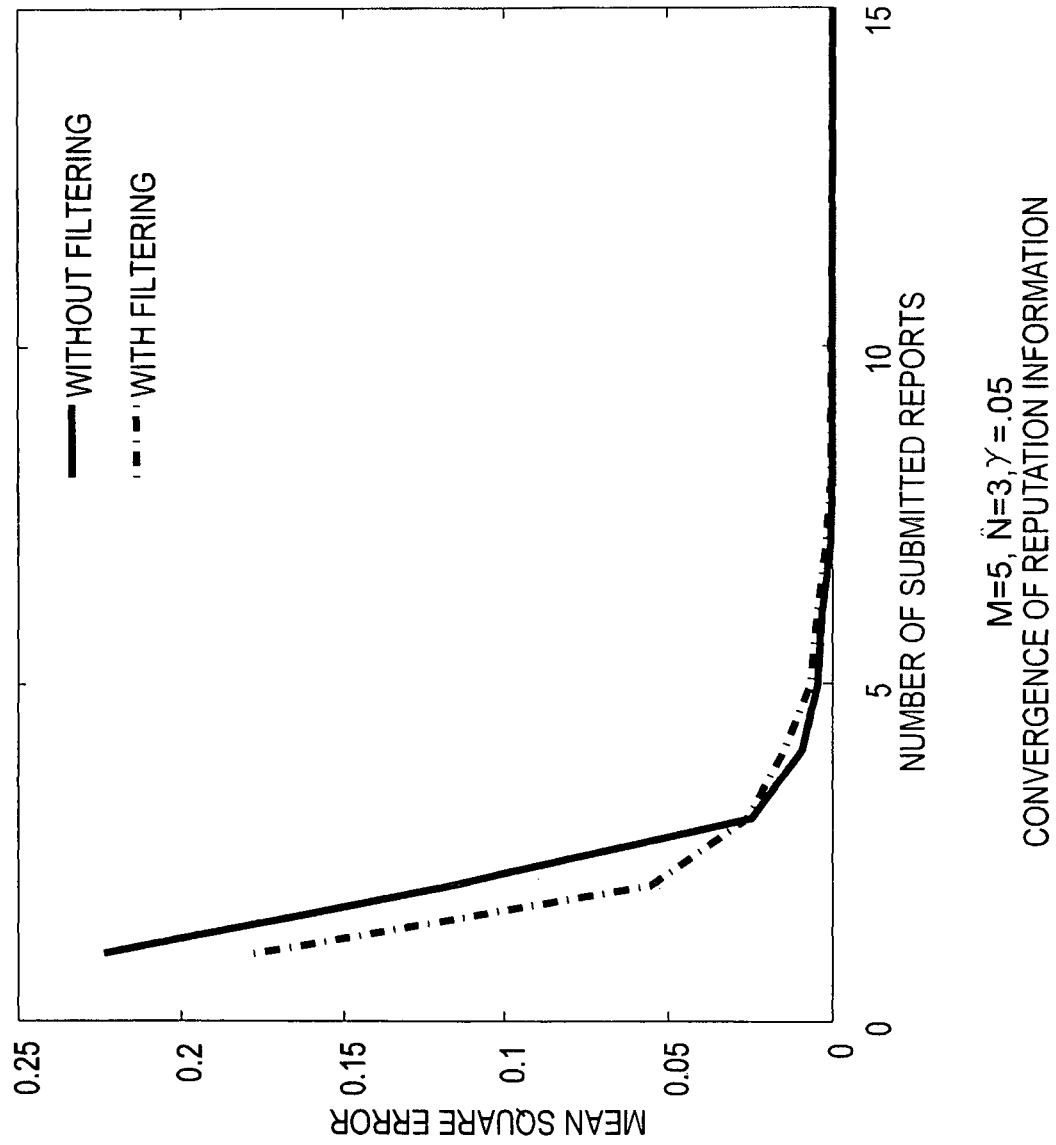

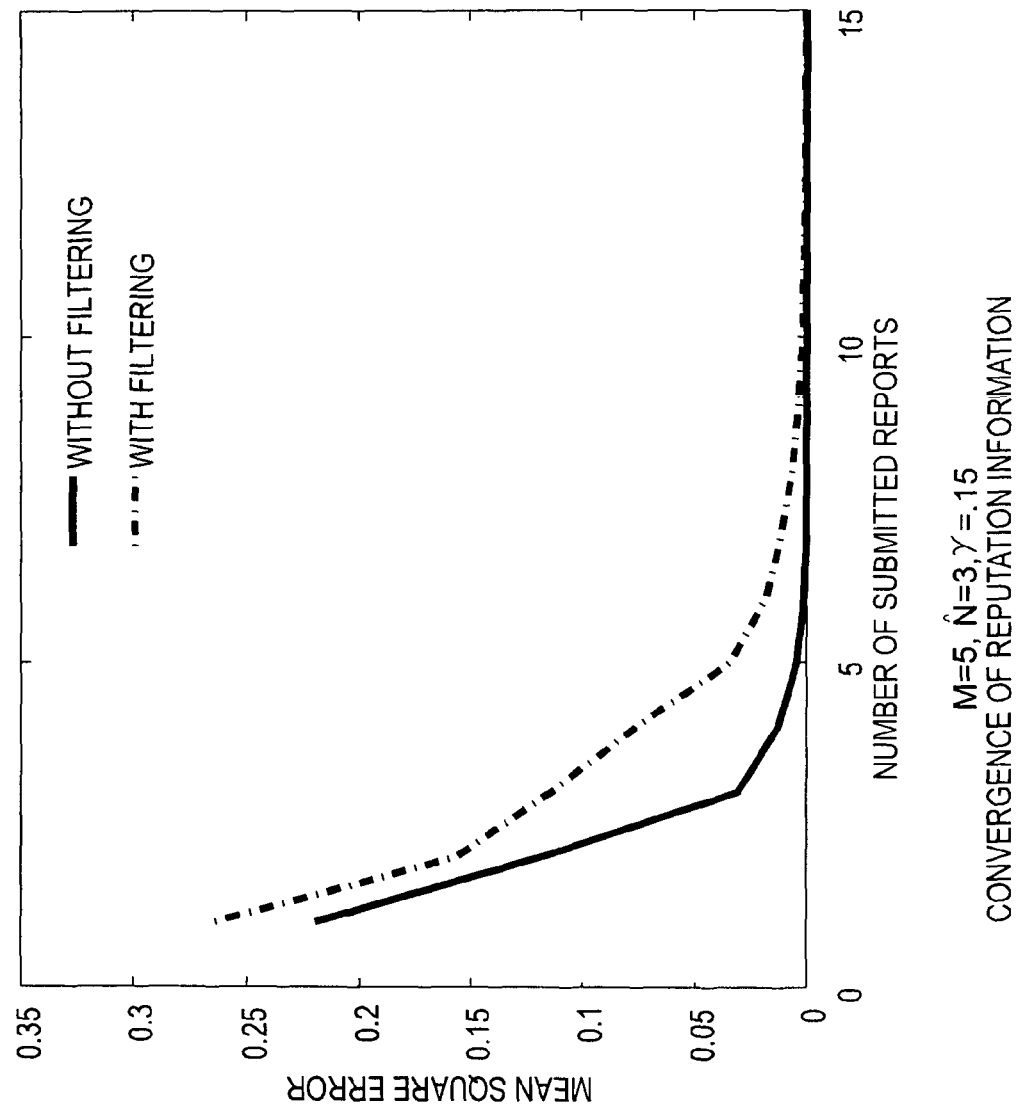

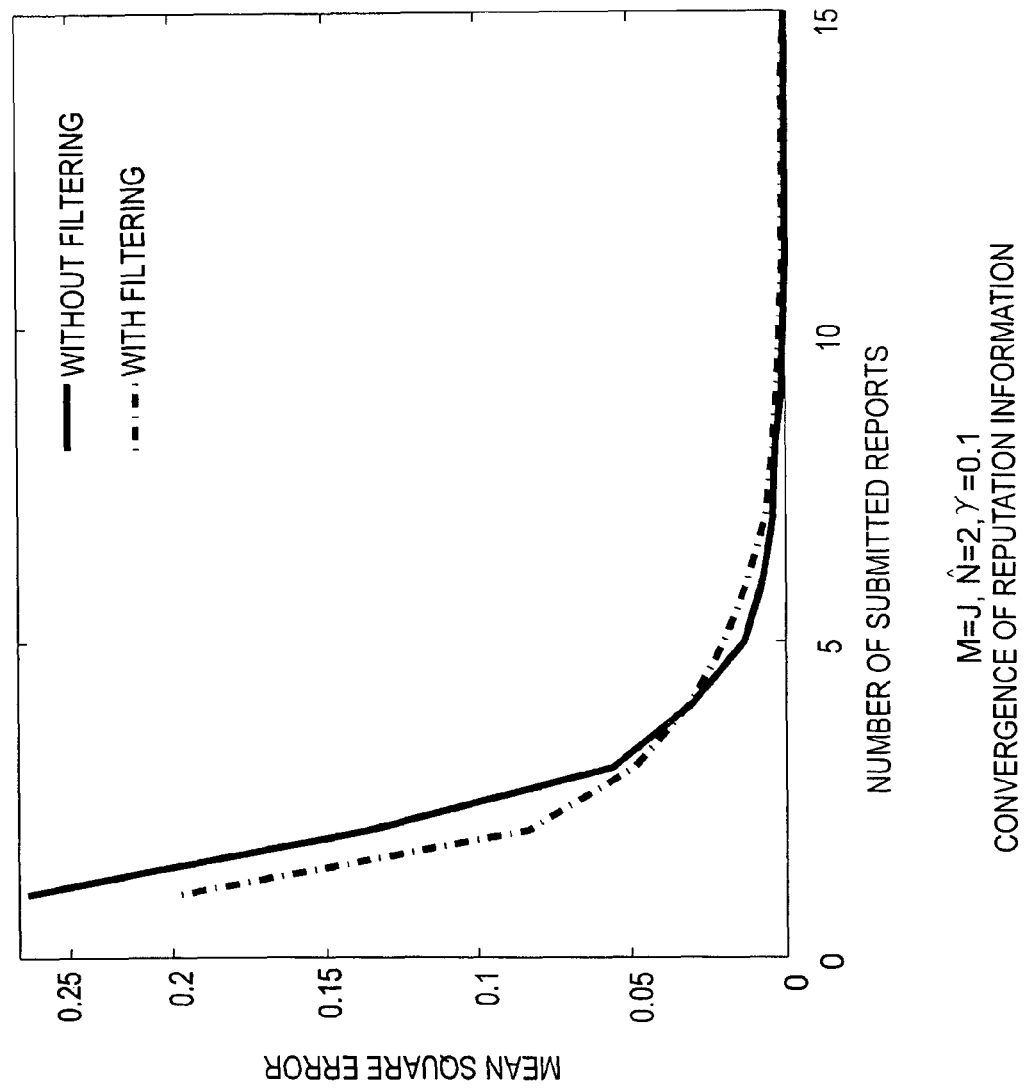

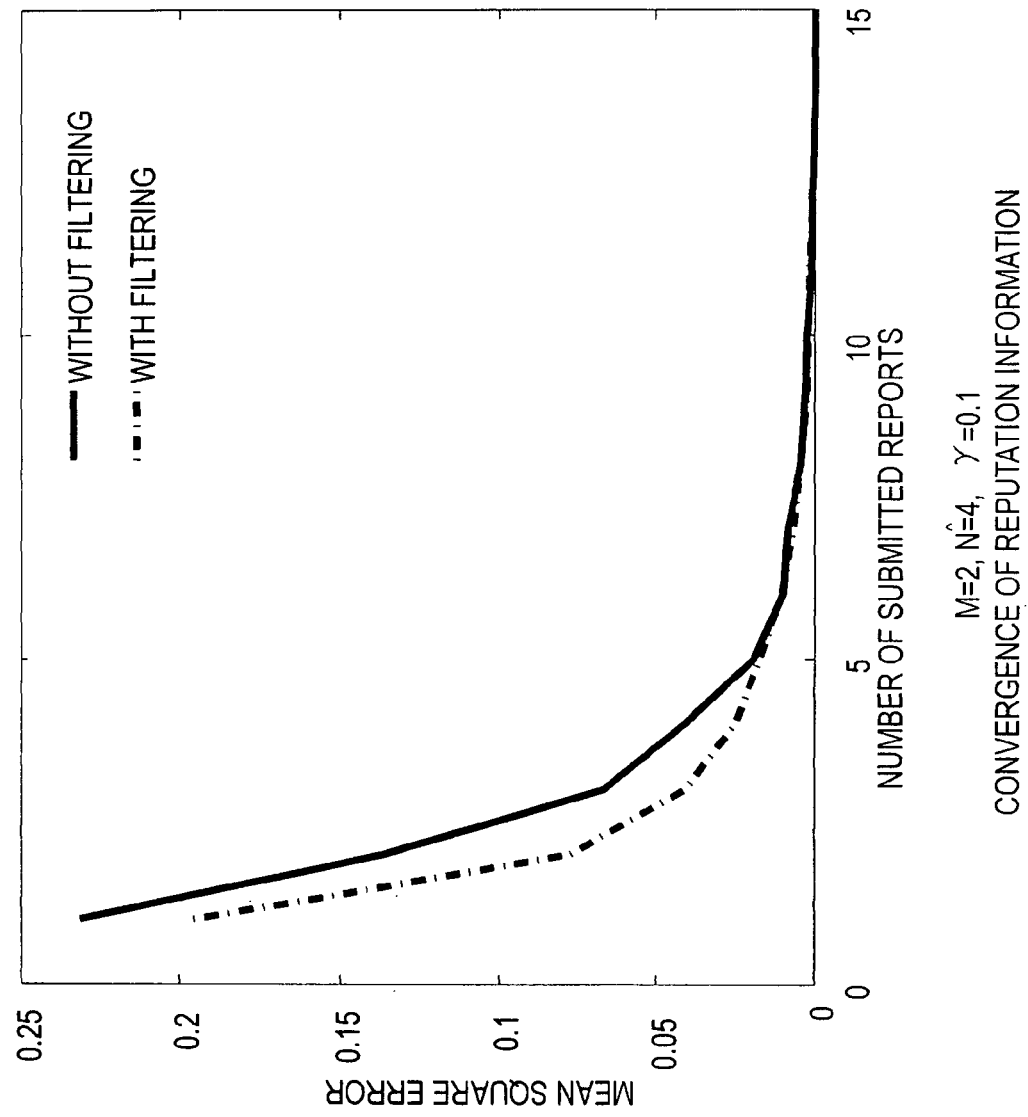

TRADEOFF BETWEEN THE COST OF INCENTIVE COMPATIBLE
PAYMENTS AND TOLERATED THRESHOLD OF COLLUDING LIARS

THE QoS AS A FUNCTION OF NUMBER OF
REQUESTS ACCEPTED BY A SERVICE
PROVIDER (EXPERIMENTALLY DETERMINED)

THE REVENUE FUNCTION OF THE SERVICE PROVIDER
DEPENDING ON THE NUMBER OF ACCEPTED REQUEST

THE DIFFERENCE IN SERVICE PROVIDER UTILITY
LOSS CAUSED BY USING ONLY TRUSTED REPORTS

THE MONITORING COST OF NOT USING
REPUTATION INFORMATION

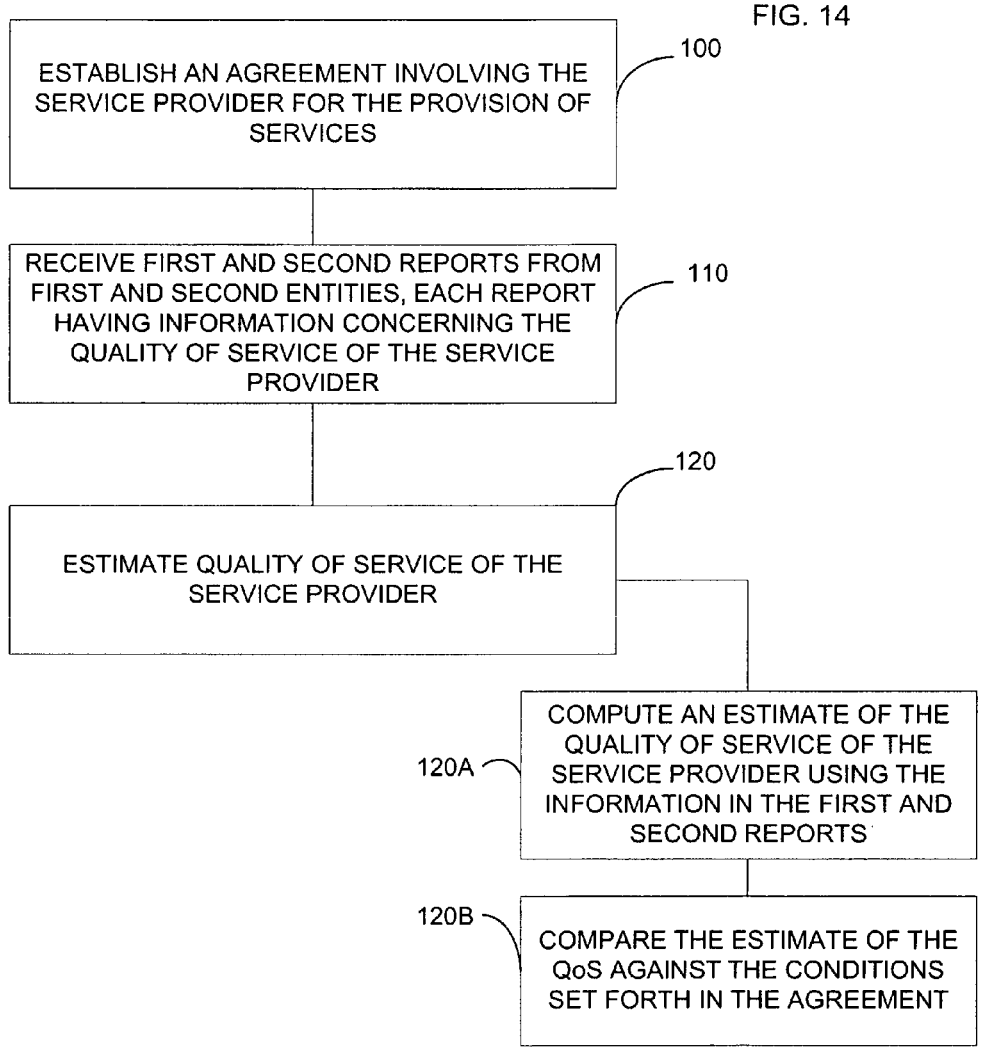

QUALITY OF SERVICE MONITORING OF A SERVICE LEVEL AGREEMENT USING A CLIENT BASED REPUTATION MECHANISM ENCOURAGING TRUTHFUL FEEDBACK

CROSS-REFERENCE TO RELATED APPLICATIONS

Not applicable.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable.

BACKGROUND OF INVENTION

The present invention relates generally to quality of service monitoring, and in particular to methods and systems for monitoring reliably the quality of service based on reputation information.

An increasing fraction of a modern economy consists of services. Services are generally provided under a contract that fixes the type and quality of the service to be provided as well as penalties if these are not met. We call such a contract a Service Level Agreement (hereinafter to as "SLA"). For example, an airline provides as a service the transportation of a passenger within certain time constraints and may incur certain penalties if this service is not delivered. Another example is providing a communication service where a certain availability and capacity is guaranteed and penalties may be incurred if these guaranteed services are not reached. Yet another example is the provisioning of computation or data management services through a network, where a certain efficiency and capacity is guaranteed in an agreement and penalties may be incurred if these guaranteed services are not reached.

An essential requirement for such service provisioning is to be able to monitor the quality of service that was actually delivered. As the monetary value of individual services decreases, the cost of providing accurate monitoring takes up an increasing share of the cost of providing the service itself. For example, with current technology, reliably monitoring the quality of a communication service requires constant communication with a neutral third party and would be almost as costly as providing the service itself. The cost of this monitoring remains a major obstacle to wider adoption of a service-oriented economy.

BRIEF SUMMARY OF THE INVENTION

The present invention disclosed herein relates to a system and method for accurately monitoring the quality of service as actually delivered. While the system and method can be used for a wide range of services, they are particularly suitable for monitoring services that are provided to a large group of users that are treated equally by the service provider.

In brief, the system and method in accordance with the present invention incorporates the reports of each user that actually observed the quality of service. Then, the quality of service as delivered is estimated from an aggregation of these reports, compliance with the service level agreement is measured against this estimation and possible penalties can be distributed to the community of users. The system and method also includes a reward mechanism or steps, respectively, where clients are rewarded for reporting their observed quality of service. The reward may be a payment or other type of reward. To provide incentive to report the true quality of service, the rewards are scaled so that clients receive larger rewards for truthful reports. These rewards can be scaled to offset whatever benefit a client can obtain from misreporting. With these rewards, truthful reporting becomes optimal for clients, and does not need to be further enforced. Thus, the system and method in accordance with the present invention requires little or no direct interaction with the monitoring authority, and can be implemented at much lower cost than previously known methods.

Whether a report is truthful or not is decided by comparing the report with those provided by other clients or the monitoring authority. Several alternative systems and methods are disclosed herein for ensuring the accuracy of this assessment even when a group of malicious clients coordinate their actions to fool the system.

In accordance with an embodiment of the invention, a computer implemented method is provided for monitoring the quality of service of a service provider, the method comprising the steps of receiving first and second reports from first and second clients, respectively, the first and second reports having information relating to the quality of service provided by the service provider to the first and second clients, respectfully, and estimating the quality of service of the service provider by aggregating the information in the first and second reports and comparing the aggregated information with conditions set forth in an agreement involving the service provider.

In accordance with another embodiment, a computer implemented method is provided for monitoring the quality of service of a provider, the method comprising the steps of establishing an agreement wherein the service provider agrees to provide a specified quality of service to first and second clients receiving a first and second report from the first and second clients, respectively, each report including information relating to the quality of service of the service provider; and estimating the quality of service as delivered based on first and second reports.

In accordance with another embodiment, a system is provided for monitoring the quality of service of a service provider, the system comprising a mechanism including a component for receiving first and second reports from first and second clients, respectively, the first and second reports having information relating to the quality of service provided by the service provider to the first and second clients, respectively and a component for estimating the quality of service of the service provider by aggregating the information in the first and second reports and comparing the aggregated information with conditions set forth in an agreement involving the service provider.

In yet another embodiment of the present invention, a system is provided for monitoring the quality of service of a provider, the system comprising a mechanism including a component for receiving first and second reports from first and second clients, respectively, the first and second clients receiving services from the service provider in accordance with an agreement involving the service provider, each report including information relating to the quality of service of the service provider; and a component for estimating the quality of service as delivered based on the first and second reports.

In yet another embodiment of the present invention, a method is provided for monitoring the quality of service of a service provider, the method comprising the steps of receiving a report from a client with information relating to the quality of service of the service provider, and estimating the quality of service of the service provider based on the report.

BRIEF DESCRIPTION OF THE DRAWINGS

The accompanying drawings, which are incorporated herein and constitute a part of the specification, illustrate embodiments of the invention, and together with the general description given above and the detailed description of the embodiments given below, serve to explain the principals of the invention.

FIG. 6 is a plot of average expected payment to one agent when several reference reports are used.

FIGS. 7(a) and 7(b) are plots of the tradeoff between cost reduction and information loss.

FIGS. 8(a)-(d) are plots of the mean square error of the reputation information published by a mechanism or component that filters or does not filter.

FIG. 14 is flowchart of the method steps in accordance with an embodiment of the invention.

DETAILED DESCRIPTION OF THE INVENTION

A. Settings and Assumptions

Figure 1:
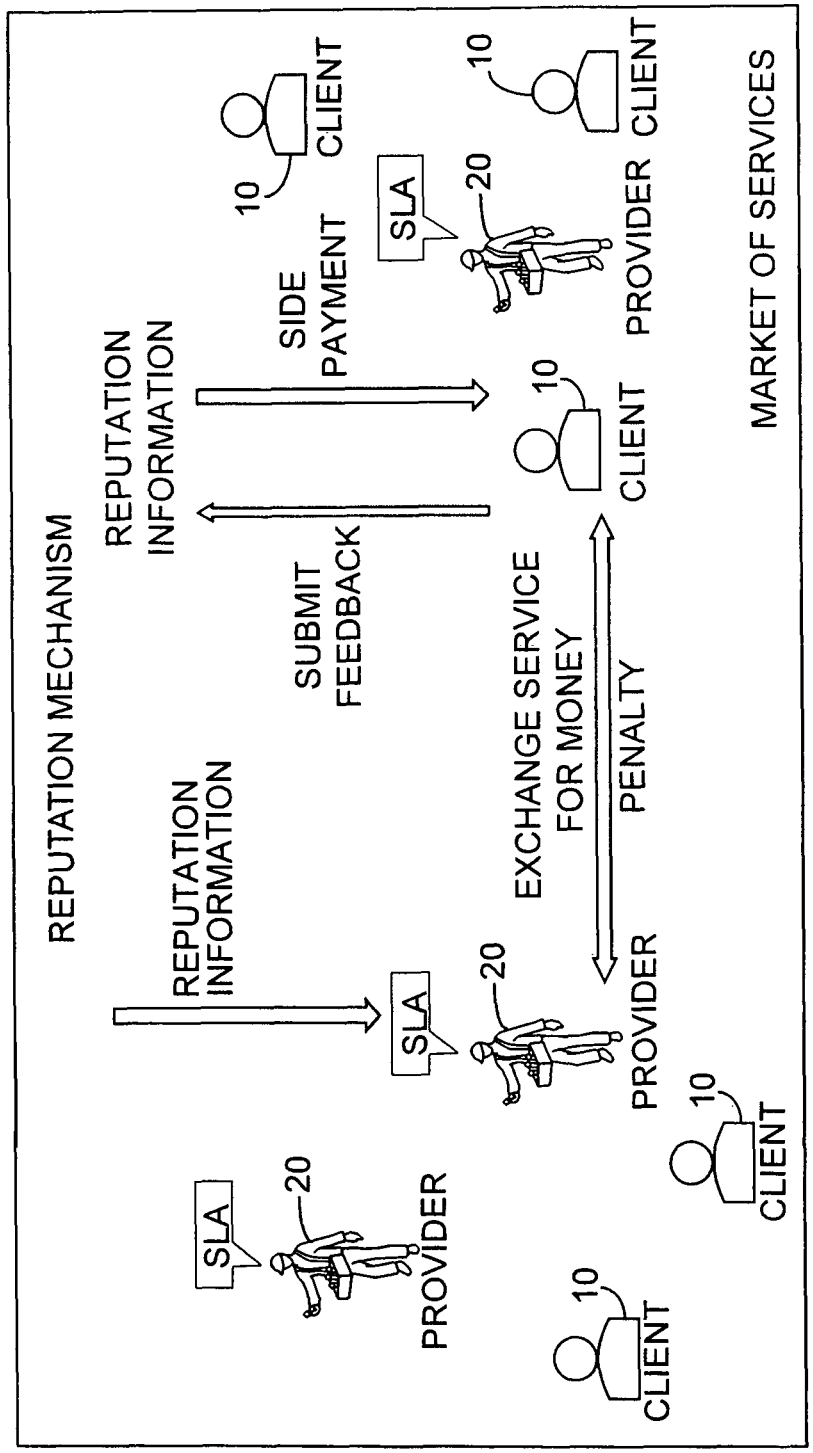
FIG. 1 is a diagram of a market of web services.

Referring to FIG. 1, an online market of services is shown wherein different clients 10 interact with different service providers in a decentralized manner. Clients as used herein are those that interact with or use the services of the service provider 20. There is no trusted authority or proxy mediating the transactions between clients and providers, except that discovery is facilitated by service directories. Both clients 10 and providers 20 have digital identities based on public key infrastructure. The complete upper level interaction protocol is described below under Interaction Protocol.

Services are defined by binding SLAs specifying both functional and non-functional (quality) attributes (i.e., conditions). See http://www.gridforum.org/Public Comment Docs/Documents/Oct-2005WS-AgreementSpecificationDraft050920.pdf (Web Services Agreement Specification (WS-Agreement), Version 2005/09). The contents of this document are incorporated by reference herein. Time is divided into equal periods. It is assumed that the same SLA is shared by a large group of clients in any given period of time. The same service provider 20 may have several customer groups, but all clients 10 within the same group are treated equally (within the same period of time). The length of the time period is an application dependent parameter, set to meet the two constraints above (i.e., large number of client requests per period with the same SLA and service parameters).

Quality of Service (also referred to herein as "QoS") is specified over one or several quality attributes that may, for example be semantically described in a common ontology. Objective quality attributes that take discrete values are considered, and such attributes can be observed by clients for single service invocations. Variables such as ServiceIsAlive or InvocationFailure are self described examples of such quality attributes. They are understood by all agents (those skilled in the art) in the same way. These variables can be measured for each interaction, and can take Boolean values. ResponseTime and Bandwidth are also self described examples of attributes. They are both objective and observable, but usually take continuous values. For most applications, however, clients 10 are indifferent between values that fall within some range, and therefore, they can be made a discrete value: e.g., Bandwidth $\in$ {DialUp, DSL, T1}.

The SLA provides quality guarantees on one or several quality attributes. Such guarantees may for example be expressed as probability distributions over possible values for each of the quality attributes. More complex quality attributes like Availability can therefore be indirectly expressed as a probability distribution over the boolean values of the quality attribute ServiceIsAlive.

The values of different quality attributes may be independent, or correlated. For example, certain values of certain quality attributes may render the observation of other quality attributes impossible: e.g., if for the present invocation, the ServiceIsAlive attribute has the value FALSE, the value of the ResponseTime attribute cannot be observed. Other forms of correlation are also possible.

Formally, the sets Q and $V_i$ are defined. $Q=\{q_1,q_2,\ldots,q_n\}$ is set for all quality attributes defined by this ontology and $V_i$ is the domain of values of the quality attribute $q_i$. Generally, the dependence between quality attributes is expressed through a (linear) correlation factor between the values of those attributes. In the present model, however, one possible representation of dependencies is through the relation $R=\{(q_i,v_i,q_j)|q_i,q_j \in Q, v_i \in V_i\}$ specifying all tuples or data structures $(q_i,v_i,q_j)$ such that when the quality attribute $q_i$ takes the value $v_i \in V_i$, the quality attribute $q_j$ cannot be observed. For example, the tuple (ServiceIsAlive, FALSE, ResponseTime) used for computing, will be a member of this set.

One possible description of the quality attribute $q_i$ is a probability distribution $\mu_i: V_i \rightarrow (0,1)$ over all possible values of the attribute. A quality advertisement (as published by a SLA) describes a subset $\overline{Q} \subseteq Q$ of quality attributes. $\overline{Q}$ denotes the set of all possible quality advertisements, and $\overline{q}$ denotes members of this set (i.e., $\overline{q}$ uniquely characterizes an SLA). Quality advertisements may be subject to certain conditions on the overall context in which the service is provided.

Service providers 20 differ in their ability and knowledge to provide qualitative services. For example, the time required to successfully answer a service invocation (up to some random noise) depends on the available infrastructure (e.g. hardware, software, network capacity) and on the number of requests accepted by the provider 20 in a given time window.

The infrastructure is assumed fixed and defines the type of the provider. Two providers 20 have the same type if they have exactly the same capabilities for providing service. Formally, the set of possible types is denoted by $\Theta$ and members of this set are denoted as $\theta$.

The number of accepted requests, on the other hand, can be strategically decided by the service provider. Given the available infrastructure (i.e. a type), the service provider 20 needs to limit the number of accepted requests in order to deliver the required answers before the deadline, with high probability. Providing high QoS requires effort (e.g. limiting requests and giving up revenue), and hence, has a cost.

Now, $c(\theta,e)$ shall be the cost incurred by a provider 20 of type $\theta$ when exerting effort e in a given period of time. The cost function is private to each service provider 20 type and is usually convex (i.e. higher quality demands increasingly more effort). However, the results discussed herein are independent of the form of the cost function.

After every interaction, the client 10 observes a value for some (possibly all) of the quality attributes specified in the SLA. A quality observation, $o=(v_i)$, $v_i \in V_i \cup \{\text{null}\}$, $q_i \in \overline{Q}$, is a vector containing a value for each of the quality attributes specified in the SLA. Since not all combinations of values can occur simultaneously (because of the constraints defined by the relation R), the quality attribute $q_j$ will have the value $v_j$=null if, for example, some other quality attribute $q_i$ has the value $v_i$, and $(q_i,v_i,q_j) \in R$. As quality observations give signals to the clients 10 about the QoS delivered by the provider 20, the terms signal and quality observation are used interchangeably. The set of all possible signals is $S=\{s_1, s_2, \ldots, s_M\}$.

The provider's type (e.g. available infrastructure) and effort (e.g. number of accepted requests) determine the distribution of signals observed by clients 10. If $\epsilon$ is denoted by the set of possible effort levels, the function f: $\theta \times \epsilon \times S \rightarrow (0,1)$ defines the probability distribution versus signals for a given type and effort. $\Sigma_{s \in S} f(\theta,e,s)=1$ for all $\theta \in \Theta$ and $e \in \epsilon$.

A trusted reputation mechanism ("RM") 30 is responsible for gathering and aggregating the feedback reports from the clients 10. RM 30 includes one or more components that achieve or accomplish the specified tasks as disclosed herein. RM 30 may also be described to perform a series of steps of a method as disclosed herein. The feedback report is used to compute the delivered QoS and to update (in an application dependent manner) the reputation information about the service provider 20. Feedback report consists of a set of quality reports about the interactions between a client 10 and a service provider 20. It is assumed that quality observations can be derived automatically from the messages exchanged between the client 10 and the provider 20. To facilitate the reporting, the RM 30 makes available the monitoring and reporting code that allows the clients 10 to automatically submit feedback. The RM 30 includes several components to perform its functions as described herein.

B. Interaction Protocol.

In our environment service providers 20 advertise SLAs and offer the corresponding services. Clients 10 chose SLAs and invoke the respective services; one or several RMs 30 collect and aggregate feedback from the clients; a bank 40 may be used to handle payments; a Certification Authority ("CA") 50 may be used to provide digital identities. The RMs 30, the bank 40 and the CA 50 are trusted parties. They may be implemented in a distributed way, but all of the components are assumed to be under the control of the same trusted entity.

Figure 2:
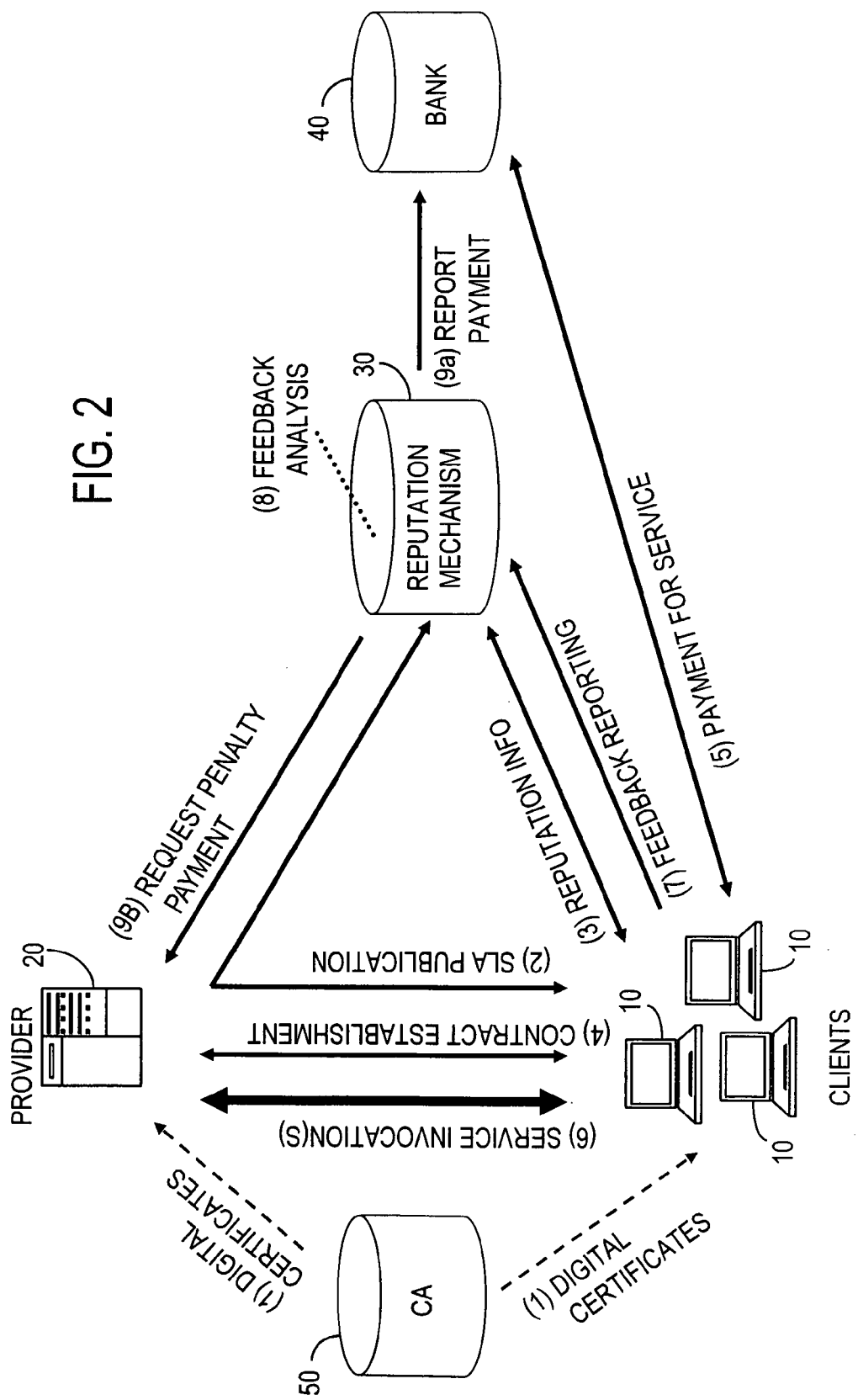
FIG. 2 is a diagram that illustrates the interaction between components in accordance with an embodiment of the present invention.

FIG. 2 illustrates one example of the interacting participants mentioned above. A description of the process steps and components of the interaction is set forth below. In particular, points 1-9 below refer to the process arrows in FIG. 2.

1. (optional) Clients 10, providers 20, the reputation mechanism (RM) 30 and the bank 40 obtain digital identity certificates from the certification authority (CA) 50.

2. Providers 20 advertise SLAs to a group of clients 10. Each SLA uniquely identifies the service provider 20 and the service functionality, for example by referring to a web service definition language (WSDL) service description and defines the price and QoS for service invocation. The RM 30 records the SLA advertisement and accepts the feedback report regarding that SLA. At this point, the RM 30 may also publish the payments awarded for feedback report about this specific SLA (detail for computing the payments will be presented below under section D, "Incentives for Truthful Reporting"). Advertised SLAs remain valid for a period of time specified by the provider 20; once expired, they are discarded. SLAs may also be refreshed by service providers 20. Each SLA receives a unique SLA-ID (e.g., a secure hashcode of the SLA). As indicated above, clients 10 interact with or use the services of services providers 20. The service provider is a party to the SLA. However, another (second) party to the SLA may be any entity that represents the interests of the clients. For example, the entity may be a party that contracts services for its customers. An insurance company is an example of this. The insurance company may contract the services (of the service provider) for its customers. In another example, the entity could be a regulator, such as the FCC, or could be the clients themselves.

3. Clients 10 search for advertised SLAs according to functional and non-functional criteria as well as according to reputation information from RM 30.

4. The client 10 and the chosen provider 20 establish a contract for a given SLA, for a given period of time. The client 10 sends a request message to the service provider 20, including Client-ID, SLA-ID, and the number of requested service invocations, Nr-Invoc. The service provider 20 may reject the request, if it (temporarily) cannot meet the conditions of the SLA. The response message sent by the service provider 20 is a non-forgeable service invocation capability (hereinafter "SIC"), valid for Nr-Invoc service invocations according to the conditions advertised in the SLA SLA-ID. The SIC will also be used by the client 10 to report feedback. It is important to note that the client 10 alternatively may specify the frequency of invocations instead of specifying the number of invocations.

5. If this case, the client 10 makes payment to the bank 40 for the agreed number of service invocations (e.g., Nr-Invoc times the price stated within the SLA). The payment message includes the SIC, and the bank returns the signed SIC in order to certify successful payment. Importantly, receipts of payments may be implicit or verified in various ways. In addition, payments may be monetary or other types of payment exchanges. Any kind of rewarding scheme (implicit or explicit) may be used. Further, other standards or languages than that described herein may be used to write all messages that are exchanged.

6. The client 10 requests the service and the provider 20 responds. For each service invocation, the client 10 has to provide a valid SIC signed by the bank. Hence, the service provider 20 can easily determine that the client 10 has paid for the SLA. The service provider 20 keeps track of the number of service invocations for each valid SIC in order to ensure that this number does not exceed the contracted Nr-Invoc value. The client 10 monitors the QoS parameters to be reported to the RM 30. It is important to note that there are many other ways for specifying the interaction between the client and the provider. For example, the SIC may not be needed if every client "signs" a contract template with the provider.

7. The client 10 sends feedback to the RM 30. The feedback contains the SIC signed by the bank 40 and a time-stamped series of quality reports. For each SIC, the client 10 may send between 1 and Nr-Invoc reports. The quality reports need not necessarily be aggregated within a single message. i.e., for the same SIC, the client 10 may send several messages with a varying number of quality reports. The RM 30 does not verify whether a service was actually invoked by the client 10, but it ensures that the client 10 paid for the invocation. That is, the RM 30 rejects reports if the SIC has not been signed by the bank 40.

8. The RM 30 analyzes received feedback at the end of each time period. From all valid quality reports about a SLA, the RM 30 estimates the actually delivered QoS by computing, for example, the distribution of values (i.e., histogram) for every quality attribute (or condition) described by the SLA. Feedback can also be used to update the reputation of the service provider 20.

9. The RM 30 reports valid payments as described below under section D, "Incentives for Truthful Reporting." See arrow (9*a*) in FIG. 2. Finally, the RM 30 publishes the monitored QoS value for the current period and notifies the providers about the penalties they must pay. See arrow (9*b*) in FIG. 2. Service providers 20 who do not pay the agreed penalties may be put on a "black list" by the RM 30 and consequently will be avoided by clients 10 upon service selection.

C. Reputation-Based Service Level Agreements.

SLA based on reputation information can make higher, untruthful, advertisements of QoS unprofitable for service providers. For that, the SLA specifies a monetary penalty that must be paid by the service provider 20 to each client at the end of a given period of time. The penalty is directly proportional to the difference between promised and delivered QoS, such that the total revenue of a service provider 20 declaring higher QoS (i.e. the price of the advertised QoS minus the penalty for providing lower QoS) is lower than the price obtained from truthfully declaring the intended QoS in the first place.

Definition 1—A reputation-based Service Level Agreement states the following terms:

per_validity: the period of validity. Time is indexed according to a discrete variable t.

cust_group: the intended customer group (e.g. silver/gold/platinium customers).

QoS (denoted as $\bar{q}_t \in Q$): the advertised quality of service.

price (denoted as $p_t$: the price of service valid for the current period.

penalty: the reputation-based penalty to be paid by the service provider 20 to the client 10 for deviating from the terms of the SLA. The penalty $\lambda_t: Q \times Q \to R$ is a function of advertised QoS (i.e., $\bar{q}_t$) and delivered QoS (i.e. the reputation, $R_t$).

Clients 10 (and market operators) can check that the penalty function is high enough by analyzing the previous transactions concluded in the market (i.e., from previous QoS advertisements, reputation values and agreed penalty functions). In equilibrium, providers will exert just enough effort to deliver the promised quality, and will only pay minimum penalties due to noise introduced by the environment.

The RM 30 assumes that (1) clients 10 submit honest feedback, (2) they are able to submit feedback only after having interacted with the provider 20, and (3) they submit only one feedback per transaction. The first assumption can be integrated into the broader context of truthful feedback elicitation. The problem can be solved by side-payments (i.e. clients 10 get paid by the reputation mechanism 30 for submitting feedback) and will be addressed in more detail in below under section D, "Incentives for Truthful Reporting."

The second and third assumptions can be implemented through cryptographic mechanisms based on a public key infrastructure. As part of the interaction, providers 20 can deliver secure certificates that can later be used by clients 10 to provide feedback. An implementation of security mechanism for RMs 30 is disclosed in "An Incentive-"Compatible Reputation Mechanism," R. Jurca and B. Faltings, In *Proceedings of the IEEE Conference on E-Commerce*, Newport Beach, Calif., USA, 2003, the contents of which are incorporated herein by reference.

D. Incentives for Truthful Reporting.

Opposed to traditional techniques, the approach in accordance with the present invention is to make lying uninteresting or unrewarding, rather than impossible. A minimum of cryptographic tools is used and a payment mechanism that rewards honesty and punishes lying is proposed. The RM 30 will pay something for every submitted feedback report and the payments will be scaled such that no agent (or small coalition of agents) has the incentive to tamper with the reporting code.

Honest reputation feedback is essential for effective reputation-based SLAs. Human users exhibit high levels of honest behavior (and truthful sharing of information) without explicit incentives. However, when clients 10 are rational software agents, RM 30 must ensure that sharing truthful information is in the best interest of the reporter.

Two factors make this task difficult. First, feedback reporting is usually costly. Even when RMs 30 provide the monitoring code to capture and format quality observations, there still is a communication cost, "C" in reporting. As feedback reporting does not bring direct benefits, many agents only report when they have ulterior motives, thus leading to a biased sample of reputation information. Second, truth-telling is not always in the best interest of the reporter. False negative feedback decreases the reputation of a service and thus the price paid by the client reporter. On the other hand, providers can offer monetary compensations in exchange for favorable feedback. One way or another, external benefits can be obtained from lying and selfish agents will exploit them.

Both problems can be addressed by a payment scheme described herein that explicitly rewards honest feedback by a sufficient amount to offset both the cost of reporting and the gains that could be obtained through lying. In this respect, the present invention provides a "score" for every submitted feedback by comparing it with another report (called the reference report) about the same good. The score does not reflect the agreement with the reference report; instead it measures the quality of the probability distribution for the reference report, induced by the submitted feedback. Payments directly proportional to these scores make honest reporting a Nash equilibrium. The payments can then be scaled so that in equilibrium, the return when reporting honestly has increased by at least some margin. However, previous methods to compute the payments lead to arbitrarily high feedback payments. This can be a problem because the payments cause a loss to the RM 30 that must be made up in some way, either by sponsorship or by charges levied on the users of the reputation information.

Computational power available to RMs 30 is used and optimal payments are computed that minimize the budget required to achieve a target margin. Specifically, the optimal payment scheme in accordance with the present invention is derived such that:

given a required margin $\Delta$ to offset reporting and honesty costs, the expected budget required for feedback payments is minimized; or, conversely, given certain budget constraints, the margin $\Delta$ is maximized.

Using the framework for computing optimal feedback payment schemes, two complementary methods are then investigated that can be used to further decrease the cost of incentive-compatibility. The first requires the use of several reference reports to score feedback. The expected budget required by the RM 30 decreases with the number of employed reference reports. The second method adapts probabilistic filtering techniques to eliminate the reports that are probably false. It will be shown that such filters are successful in decreasing the lying incentives, without greatly distorting the information provided by the RM 30.

D1. Computing the Optimal Payment Scheme.

In the present implementation, $a^i=(a_1^i,\ldots,a_M^i)$ shall be the reporting strategy of client i, such that the client reports $a_j^i \in S$ whenever the client 10 observes the signal $s_j$. The honest reporting strategy is $\bar{a}=(s_1,\ldots,s_M)$, when the client always declares the truth.

The RM pays clients 10 for submitting feedback. The amount received by client i is computed by taking into account the signal announced by i, and the signal announced by another client, r(i), called the reference reporter of i. $\tau(a_j^i, a_k^{r(i)})$ shall be the payment received by i when the client announces the signal $a_j^i$ and the reference reporter announces the signal $a_k^{r(i)}$. The expected payment of the client i depends on the prior belief, on the client's observation $s_j$, and on the reporting strategies $a^i$ and $a^{r(i)}$:

$$V(a^i, a^{r(i)} \mid s_j) = E_{s_k} \in s[\tau(a_j^i, a_k^{r(i)})] \qquad (1)$$

$$= \sum_{k=1}^{M} Pr[s_k \mid s_j]\tau(a_j^i, a_k^{r(i)});$$

The conditional probability distribution, $Pr[s_k|s_j]$, for the signal observed by the reference reporter, as well as the probability $Pr[s_i]$ that the client expects to observe the signal $s_i$ are assumed known, and can be computed from analyzing past data about a provider 20.

$C \geq 0$ is also taken as an upper bound for the feedback reporting cost of one client 10 and $\Delta(s_j, a_j^i)$ as an upper bound on the external benefit a client 10 can obtain from falsely reporting the signal $a_j^i$ instead of $s_j$.

Figure 3:
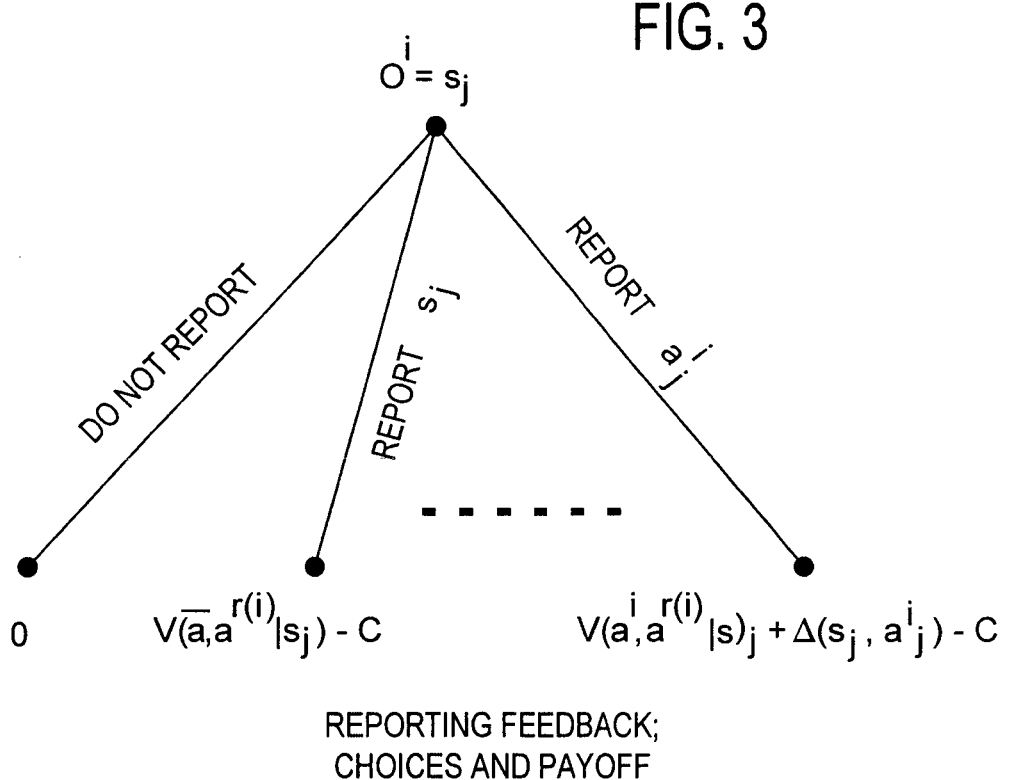
FIG. 3 illustrates a client's expected payoff for reporting feedback.

For discussion, consider the client i who purchases the product and observes the quality signal $s_j$. When asked by the RM 30 to submit feedback, the client can choose: (a) to honestly report $s_j$, (b) to report another signal $a_j^i \neq s_j \in S$ or (c) not to report at all. FIG. 3 illustrates the client's expected payoff for each of these cases, given the payment scheme $\tau(\square,\square)$ and the reporting strategy $a^{r(i)}$ of the reference reporter.

Truthful reporting is a Nash equilibrium (hereinafter "NEQ") if the client 10 finds it optimal to announce the true signal, whenever the reference reporter also reports the truth. Formally, the honest reporting strategy $\bar{a}$ is a NEQ if and only if for all signals $s_j \in S$, and all reporting strategies $a^* \neq \bar{a}$:

$$V(\bar{a}, \bar{a}|s_j) \geq V(a^*, \bar{a}|s_j) + \Delta(s_j, a^*_j);$$

$$V(\bar{a}, \bar{a}|s_j) \geq C;$$

When the inequalities are strict, honest reporting is a strict NEQ.

For any observed signal $O^i=s_j \in S$, there are M−1 different dishonest reporting strategies $a^* \neq \bar{a}$ the client 10 can use: i.e., report $a_j^*=s_h \in S\backslash\{s_j\}$ instead of $s_j$. Using equation (1) above to expand the expected payment of a client 10, the NEQ conditions become:

$$\sum_{k=1}^{M} Pr[s_k \mid s_j](\tau(s_j, s_k) - \tau(s_h, s_k)) > \Delta(s_j, s_h); \qquad (2)$$

$$\sum_{k=1}^{M} Pr[s_k \mid s_j]\tau(s_j, s_k) > C;$$

for all $s_j, s_h \in S$, $s_j \neq s_h$.

Any payment scheme $\tau(\square,\square)$ satisfying the conditions in equation (2) above is incentive-compatible.

Given the incentive-compatible payment scheme $\tau(\square,\square)$, the expected amount paid by the RM 30 to one client 10 is:

$$W = E_{s_i} \in s[V(\bar{a}, \bar{a} \mid s_j)] = \sum_{j=1}^{M} Pr[s_j]\left(\sum_{k=1}^{M} Pr[s_k \mid s_j]\tau(s_j, s_k)\right);$$

The optimal payment scheme minimizes the budget required by the RM 30, and therefore solves the following linear program (i.e., linear optimization problem):

LP 1

$$\min W = \sum_{j=1}^{M} Pr[s_j]\left(\sum_{k=1}^{M} Pr[s_k \mid s_j]\tau(s_j, s_k)\right)$$

$$\text{s.t.} \sum_{k=1}^{M} Pr[s_k \mid s_j](\tau(s_j, s_k) - \tau(s_h, s_k)) > \Delta(s_j, s_h);$$

$$\forall s_j, s_h \in S, s_j \neq s_h;$$

$$\sum_{k=1}^{M} Pr[s_k \mid s_j]\tau(s_j, s_k) > C; \forall s_j \in S$$

$$\tau(s_j, s_k) \geq 0, \forall s_j, s_k \in S$$

The payment scheme $\tau(\square,\square)$ solving equations in linear program "LP 1" depends on the cost of reporting, on the external benefits from lying, and on prior knowledge about the service provider 20.

The RM 30 can use other objective functions in the linear program "LP 1". For example, the RM may wish to minimize (a) the expected payment to a group of N clients 10, or (b), the worst case payment to one, or a group of clients 10. Likewise, the RM 30 may adapt the incentive-compatibility constraints in (2) to reflect different risk profile of the clients 10, or to include other application-dependent constraints.

D2. Unknown Lying Incentives.

LP 1 reveals a strong correlation between the minimum expected cost and the external benefits obtained from lying. Low lying incentives generate lower expected payments. When finding accurate approximations for the lying incentives is difficult, the RM 30 might be designed to compute the payment scheme that satisfies certain budget constraints and maximizes the tolerated misreporting incentives. The algorithm for computing these payments follows directly from LP 1: the objective function becomes a constraint (e.g., expected budget is bounded by some amount, Γ) and the new objective is to maximize the worst case (i.e., minimum) expected payment loss caused by misreporting:

LP 2

$$\max \Delta$$

$$\text{s.t.} \sum_{j=1}^{M} Pr[s_j]\left(\sum_{k=1}^{M} Pr[s_k \mid s_j]\tau(s_j, s_k)\right) \leq \Gamma;$$

$$\sum_{k=1}^{M} Pr[s_k \mid s_j](\tau(s_j, s_k) - \tau(s_h, s_k)) > \Delta;$$

$$\forall s_j, s_h \in S, s_j \neq s_h;$$

$$\sum_{k=1}^{M} Pr[s_k \mid s_j]\tau(s_j, s_k) > \Delta; \forall s_j \in S$$

$$\tau(s_j, s_k) \geq 0; \forall s_j, s_k \in S$$

The resulting scheme guarantees that any client 10 will report honestly when the reporting costs and external lying benefits are smaller than Δ. The same as for LP 1, the RM 30 may modify the optimization problem LP 2 to fit application dependent objectives and constraints.

D3. Computational Complexity and Possible Approximations.

The linear optimization problems LP 1 and LP 2 are similar in terms of size and complexity: LP 1 has $M^2$ variables and $M^2$ inequality constraints. LP 2 has $M^2+1$ variables and $M^2+1$ inequality constraints. The complexity and (runtime) of LP 1 will be analyzed and the conclusions will be extended for LP2 as well.

The worst case complexity of linear optimization problems is $O(n^4L)$, where $n=M^2$ is the number of variables and L is the size of the problem (approximatively equal to the total number of bits required to represent the problem). The average time required to solve LP 1 is evaluated by using a standard linear solver, for example, the Optimization Toolbox of Matlab 7.0.4 by Mathworks. For different sizes of the feedback set (i.e., different values of M) 2000 settings were randomly generated. Table 1 sets forth the average CPU time required to find the optimal payment scheme on a conventional (average) laptop (e.g., 1.6 GHz Centrino processor, 1 Gb RAM, WinXP operating system). Up to M=16 possible quality signals, general purpose hardware and software can find the optimal payment scheme in less than half a second.

TABLE 1

Average CPU time (and standard deviation) for computing the optimal payment scheme.

| M | CPU time [ms] |
|---|---|
| 2 | 11.16 (σ = 3.5) |
| 4 | 19.24 (σ = 3.7) |
| 6 | 29.22 (σ = 4.4) |
| 8 | 55.62 (σ = 6.7) |
| 10 | 92.79 (σ = 7.5) |
| 12 | 174.81 (σ = 11.1) |
| 14 | 316.63 (σ = 18.4) |
| 16 | 521.47 (σ = 25.4) |

The optimal payment scheme depends on the prior knowledge about the provider, and therefore, must be recomputed after every submitted feedback. Although linear optimization algorithms are generally fast, frequent feedback reports could place unacceptable workloads on the RM 30. Two solutions can be envisaged to ease the computational burden:

publish batches of reports instead of individual ones. The beliefs of the clients thus change only once for every batch, and new payments must be computed less frequently. The right size for the batch should be determined by considering the frequency of submitted reports and the tradeoff between computational cost, and the efficiency losses due to delayed information.

approximate the optimal payments, either by closed form functions (e.g., scoring rules) or by partial solutions of the optimization problem. The rest of this section develops on these latter techniques.

The first approximation for the optimal incentive compatible payment scheme is provided by using proper scoring rules (as for example, described in "Eliciting Informative Feedback: The Peer-Prediction Method," N. Miller, P. Resnick, and R. Zeckhauser. *Management Science,* 51:1359-1373, 2005, the contents of which are incorporated by reference herein): $\tau(s_j,s_k)=R(s_k|s_j)$, where $R(\square|\square)$ may be:

the logarithmic scoring rule:

$$R(s_k|s_j)=\ln(Pr[s_k|s_j]);$$

spherical scoring rule:

$$R(s_k \mid s_j) = \frac{Pr[s_k \mid s_j]}{\sqrt{\sum_{s_h \in S} Pr[s_h \mid s_j]^2}};$$

quadratic scoring rule:

$$R(s_k \mid s_j) = 2Pr[s_k \mid s_j] - \sum_{s_h \in S} Pr[s_k \mid s_j]^2;$$

The constraints from LP 1 can be satisfied by: (a) adding a constant to all payments such that they become positive: i.e., $\tau(s_j,s_k)=\tau(s_j,s_k)-\min s_h,s_l \in S[\tau(s_h,s_l)]$, and (b) multiplying all payments with a constant such that the expected payment loss when lying outweighs external benefits: i.e., $\tau(s_j,s_k)=\alpha \square \tau(s_j,s_k)$ where:

$$\alpha = \max_{\substack{a_j^*, s_i \in S \\ a_j^* \neq s_j}} \frac{\Delta(s_j, a_j^*)}{(V(\overline{a}, \overline{a} \mid s_j) - V(a^*, \overline{a} \mid s_j))}; \quad (3)$$

Figure 4:
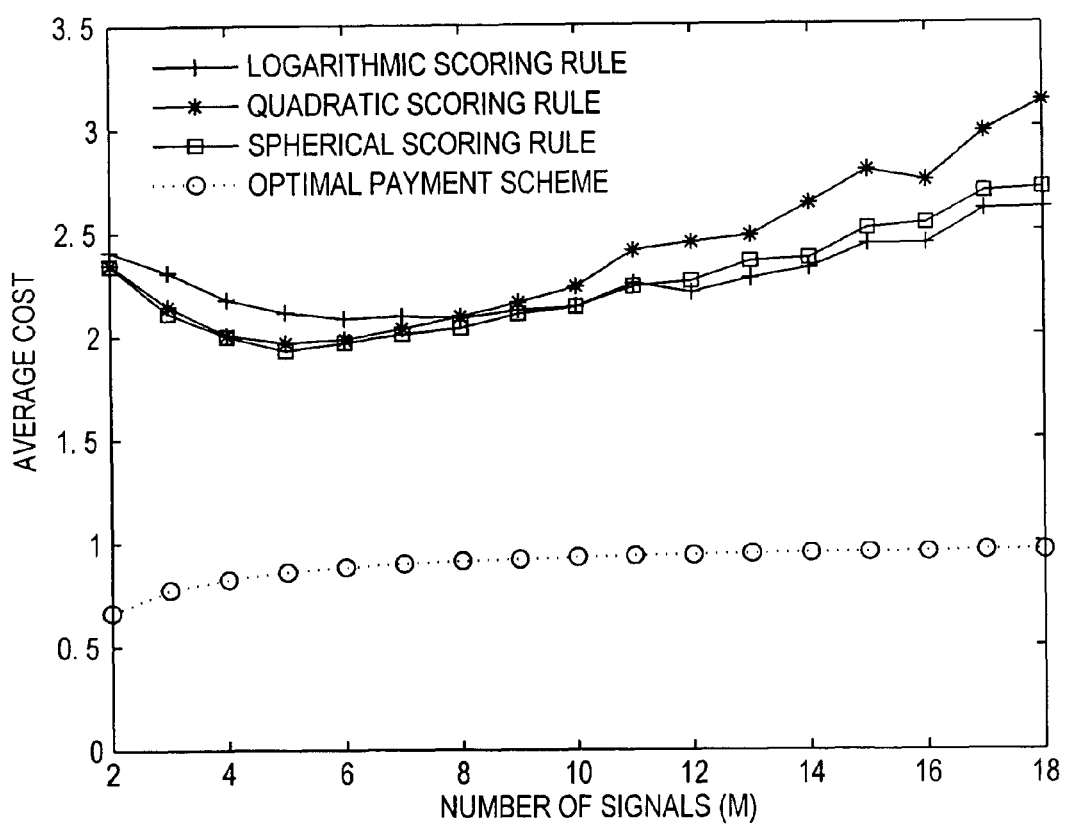
FIG. 4 is a plot of the average expected (incentive-compatible) payment to a client when payments are computed using scoring rules.

The payments based on scoring rules are two to three times more expensive than the optimal ones. The same ratio remains valid for more general settings. 2000 randomly generated settings were investigated for different number of quality signals. FIG. 4 plots the average expected payment to one client 10 when payments are computed using scoring rules.

Computational methods can also be used to obtain faster approximations of the optimal payment scheme. Most linear programming algorithms find an optimal solution by iterating through a set of feasible points that monotonically converge to the optimal one. Such algorithms are just in time algorithms as they can be stopped at any time, and provide a feasible solution (i.e., a payment scheme that is incentive-compatible, but may not be optimal). The more time there is available, the better the feasible solution. The RM 30 can thus set a deadline for the optimization algorithm, and the resulting payment scheme makes it optimal for the client to report the truth.

Figure 5:
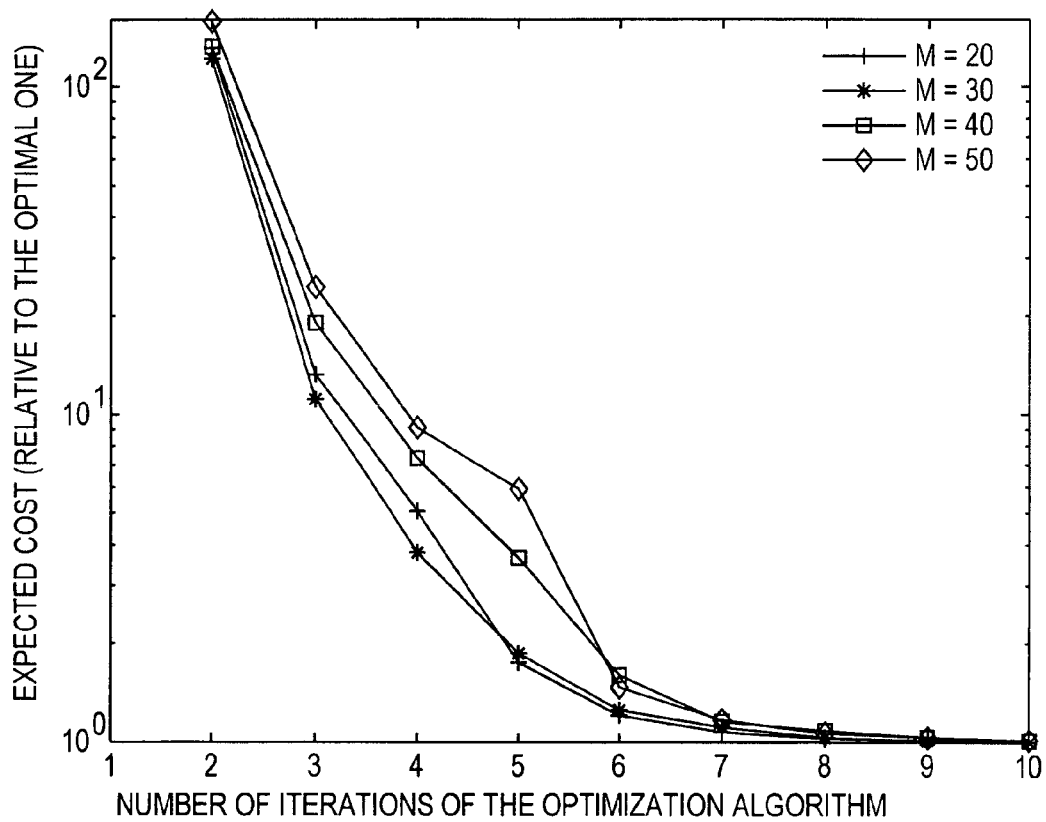
FIG. 5 is a plot of the incentive-compatible payments based on partial solutions.

FIG. 5 plots the convergence of the Matlab linear programming algorithm for large problems (i.e., large number of signals) where approximations are likely to be needed. For 500 randomly generated settings, the average relative cost (relative to the optimal one) is plotted (on a logarithmic scale) of the partial solution available after t iteration steps of the algorithm. As it can be seen, most of the computation time is spent making marginal improvements to the partial solution. For M=50 quality signals, the full optimization takes 20 steps on the average. However, the partial solution after 6 steps generates expected costs that are only 40% higher on the average than the optimal ones.

Finally, the two techniques can be combined to obtain fast accurate approximations. As many linear programming algorithms accept initial solutions, the scoring rules approximations can be used to specify a starting point for an iterative optimization algorithm.

D4. Using Several Reference Reports.

Now, N (instead of only one) reference reports are considered when computing the feedback payment due to an agent. By an abuse of notation, the same r(i) is used to denote the set of N reference reporters of agent i. Accordingly, $a^{r(i)} = (a^j)_{j \in r(i)}$ shall denote the vector of reporting strategies of the agents in r(i), and $a_k^{r(i)}$ shall be a set of submitted reports. The set of possible values of $a_k^{r(i)}$ is S(N).

As the signals observed by the agents are independent, the order in which the reference reports were submitted is not relevant. S(N) is taken to be the set of all unordered sequences of reports of length N. So, $a_k^{r(i)}$ can be represented by a vector $(n_1, \ldots, n_M)$, where $n_j$ is the number of reference reporters announcing the signal $s_j$. S(N) thus becomes:

$$S(N) = \left\{ (n_1, \ldots, n_M) \in N^M \mid \sum_{j=1}^{M} n_j = N \right\};$$

The expected payment of agent i is:

$$V(a^i, a^{r(i)} \mid s_j) = \sum_{a_k^{r(i)} \in S(N)} Pr[a_k^{r(i)} \mid s_j] \tau(a_j^i, a_k^{r(i)});$$

and the optimal payment scheme T(•,•) solves:

LP 3

$$\min \sum_{j=1}^{M} Pr[s_j] \left( \sum_{a_k \in S(N)} Pr[a_k \mid s_j] \tau(s_j, a_k) \right);$$

$$\text{s.t.} \sum_{a_k \in S(N)} Pr[a_k \mid s_j](\tau(s_j, a_k) - \tau(s_h, a_k)) > \Delta(s_j, s_h);$$

$$\forall s_j, s_h \in S_1 s_j \neq s_h,$$

$$\sum_{a_k \in S(N)} Pr[a_k \mid s_j] \tau(s_j, a_k) > C; \forall s_j \in S$$

$$\tau(s_j, a_k) \geq 0; \forall s_j \in S, a_k \in S(N)$$

The optimization problem LP 3 has $M^2$ constraints and M □|S(N)| variables, where $$|S(N)| = \frac{M \text{à} 1''}{N + M \text{à} 1}$$

(combinations of N+M−1 taken by M−1) is the cardinality of S(N).

It is proposed that the minimum budget required by an incentive compatible RM 30 decreases as the number of reference reporters increases. This statement is based on the observation that the number of constraints in the optimization problem LP 3 does not depend on the number N of reference reporters. Therefore, the number of variables of the dual of LP 3 does not depend on N. A sequence of primal and dual optimization problems, LP(N) and DP(N) respectively, is defined which characterizes the setting whereby N reference reports are considered. Any feasible solution of DP(N+1) shown is also feasible in DP(N). DP(N) is therefore "less constrained" than DP(N+1) and consequently will have a higher maximal cost. From the Duality Theorem of linear programming (See http://en.wikipedia.org/wiki/Dual_problem), it follows that the expected cost of the payment scheme defined by LP(N) is higher than the expected cost of the payments defined by LP(N+1). Thus, the budget required by an incentive compatible RM 30 decreases as the number of reference reporters increases.

Formally, the dual variables $y_j^h$ and $y_j^j$ respectively, are associated, to the constraints:

$$\Sigma_{a_k \in S(N)} Pr[a_k \mid s_j](\tau(s_j, a_k) - \tau(s_h, a_k)) > \Delta(s_j, s_h);$$

$$\Sigma_{a_k \in S(N)} Pr[a_k \mid s_j] \tau(s_j, a_k) > C;$$

The dual problem DP(N) thus becomes:

$$\max \sum_{j=1}^{M} \left( C \cdot y_j^j + \sum_{h=1}^{M} \Delta(s_j, s_h) \cdot y_j^h \right);$$

$$\text{s.t.} \sum_{h=1}^{M} y_m^h Pr[a_k \mid s_m] - \sum_{\substack{h=1 \\ h \neq m}}^{M} y_h^m Pr[a_k \mid s_h] < Pr[s_m] Pr[a_k \mid s_m];$$

$$\forall s_m \in S, a_k \in S(N)$$

$$y_j^h \geq 0; \forall j, h \in \{1, \ldots, M\}$$

Following, y shall be a feasible solution of DP(N+1). For any $s_m \in S$, let $s_j = \arg\min_{s \in S} Pr[s \mid s_m]$. For any $a_k = (n_1, \ldots, n_M) \in S(N)$, it is possible to find $a_k^* = (n_1, \ldots, n_j+1, \ldots, n_M) \in S(N+1)$ such that N reference reporters announce $a_k$ and the remaining one reports $s_j$. For all $s_h \in S$, it follows that:

$$Pr[a_k \mid s_h] = N! \prod_{k=1}^{M} \frac{Pr[s_k \mid s_h]^{n_k}}{n_k!};$$

$$Pr[a_k^* \mid s_h] = Pr[s_j \mid s_h] Pr[a_k \mid s_h] \frac{N+1}{n_j+1};$$

y is a feasible solution of DP(N+1), therefore:

$$Pr[s_m] Pr[a_k^* \mid s_m] > \sum_{h=1}^{M} y_m^h Pr[a_k^* \mid s_m] - \sum_{\substack{h=1 \\ h \neq m}}^{M} y_h^m Pr[a_k^* \mid s_h];$$

Because:

$$Pr[a_k^* \mid s_m] = \frac{N+1}{n_j+1} Pr[s_j \mid s_m] Pr[a_k \mid s_m];$$

$$Pr[a_k^* \mid s_h] = \frac{N+1}{n_j+1} Pr[s_j \mid s_h] Pr[a_k \mid s_h]$$

$$\leq \frac{N+1}{n_j+1} Pr[s_j \mid s_m] Pr[a_k \mid s_h];$$

for all $s_h \neq s_m$, y also satisfies:

$$Pr[s_m] Pr[a_k \mid s_m] > \sum_{h=1}^{M} y_m^h Pr[a_k \mid s_m] - \sum_{\substack{h=1 \\ h \neq m}}^{M} y_h^m Pr[a_k \mid s_h];$$

and is feasible in DP(N). The "cost" of DP(N) is therefore greater or equal to the cost of DP(N+1). Consequently, the budget required by a RM 30 using N reference reports is higher or equal to the budget required by a mechanism using N+1 reference reports.

Using several reference reports decreases the cost of reputation management, but also increases the complexity of the algorithm defining the optimal payment scheme. The quantitative effect of several reference reports on the budget of the RM 30 has been studied. For 2000 randomly generated settings, FIG. 6 plots the average cost as the number of reference reports is increased from 1 to 5. Significant savings (approx. 25% for a setting with M=2 quality signals, and 4% for a setting with M=8 quality signals) are mainly obtained from the second and third reference reports. As a good tradeoff between cost and computational complexity, practical systems can therefore use between 2 and 4 reference reports, depending on the number of quality signals in the set S.

D5. Filtering Out False Reports.

The feedback payments naturally decrease when the reporting and honesty costs become smaller. The cost of reporting can be decreased by software tools that help automate as much as possible the process of formatting and submitting feedback. On the other hand, the external incentives for lying can be reduced by filtering out the reports that are likely to be false.

"Truth filters" can be constructed based on statistical analysis. When all agents report truthfully, their reports follow a common distribution given by the product's true type. Reports that stand out from the common distribution are either particularly unlikely or dishonest. Either way, by filtering them out with high probability, the reputation information does not usually suffer significant degradation.

Existing filtering mechanisms or components rely on two important assumptions: a) every agent (client) submits several reports, b) according to some probabilistic lying strategy. Self-interested agents can strategically manipulate their reports to circumvent the filtering mechanisms or components and take profit from dishonest reporting. When all clients 10 are self-interested and submit only one feedback report, filtering methods based entirely on similarity metrics can never be accurate enough to filter out effectively all lying strategies without important losses of information.

In this section, an alternative filtering method is described that also exploits the information available to the agents. The intuition behind our method is simple: the probability of filtering out the report $a_j^i$ submitted by agent i should not only depend on how well $a_j^i$ fits the distribution of peer reports, but also on the benefits that $a_j^i$ could bring to the reporter if it were false. When $\Delta(s_j, a_j^i)$ is big (i.e. the agent has strong incentives to report $a_j^i$ whenever the client's true observation was $s_j$), the filtering mechanism or component should be more strict in accepting $a_j^i$ given that peer reports make the observation of $s_j$ probable. On the other hand, when $\Delta(s_j, a_j^i)$ is small, filtering rules can be more relaxed, such that the mechanism does not lose too much information. In this way, the filter adapts to the particular context and allows an optimal tradeoff between diminished costs and loss of information.

Concretely, $Pr(\theta)$, $\theta \in \Theta$ shall describe the current common belief regarding the true type of the product, $s_j, a_j^i \in S$ shall be the signals observed, respectively announced by agent i, and $a_k \in S(N)$ shall describe the set of N reference reports. The publishing of the report submitted by agent i is delayed until the next N reports (i.e., the filtering reports) are also available. A filtering mechanism or component is formally defined by the table of probabilities $\pi(a_j^i, \hat{a}_k)$ of accepting the report $a_j^i \in S$ when the filtering reports take the value $\hat{a}_k \in S(N)$. With probability $1 - \pi(a_j^i, \hat{a}_k)$ the report $a_j^i$ will not be published by the RM 30, and therefore not reflected in the reputation information. Note, however, that all reports (including dropped ones) are paid for as described in the previous sections.

The payment scheme $\tau(\square, \square)$ and the filtering mechanism or component $\pi(\square, \square)$ are incentive compatible if and only if for all signals $s_j, s_h \in S$, $s_j \neq s_h$, the expected payment loss offsets the expected gain obtained from lying:

$$\sum_{a_k \in S(N)} Pr[a_k \mid s_j](\tau(s_j, a_k) - \tau(s_h, a_k)) > \hat{\Delta}(s_j, s_h) \quad (4)$$

$$\hat{\Delta}(s_j, s_h) = \sum_{\hat{a}_k \in S(\hat{N})} Pr[\hat{a}_k \mid s_j] \cdot \pi(s_h, \hat{a}_k) \cdot \Delta(s_j, s_h);$$

where $\hat{\Delta}(\square, \square)$ is obtained by discounting $\Delta(\square, \square)$ with the expected probability that a false report is recorded by the RM 30.

Naturally, the feedback payments decrease with decreasing probabilities of accepting reports. However, a useful RM 30 must also limit the loss of information. As a metric for information loss, one chooses the number (or percentage) of useful reports that are dropped by the mechanism 30. A feedback report is useful, when given the true type of the product and a prior belief on the set of possible types, the posterior belief updated with the report is closer to the true type than the prior belief.

Formally, information loss can be quantified in the following way. Given the true type $\theta^* \in \Theta$ and the prior belief $Pr(\square)$ on the set of possible types, the report $s_j$ is useful if and only if $Pr(\theta^*) < Pr(\theta^* \mid s_j)$: i.e. the posterior belief updated with the signal $s_j$ is closer to the true type than the prior belief. Given the filtering mechanism or component $\pi(\square, \square)$, and the true type $\theta^*$, the expected probability of dropping $s_j$ is:

$$Pr[\text{drop } s_j \mid \theta^*] = 1 - \sum_{\hat{a}_k \in S(\hat{N})} Pr[\hat{a}_k \mid \theta^*] \pi(s_j, \hat{a}_k); \quad (5)$$

where $Pr[\hat{a}_k \mid \theta^*]$ is the probability that the filtering reports take the value $\hat{a}_k$, when the true type of the product is $\theta^*$. To limit the loss of information, the RM must insure that given the current belief, whatever the true type of the product, no useful report is dropped with a probability greater than a given threshold $\gamma$:

$$\forall s_j \in S, \theta \in \Theta, Pr[\theta] < Pr[\theta|s_j] \rightarrow Pr[\text{drop } s_j|\theta] < \gamma; \quad (6)$$

The incentive-compatible payment mechanism (using N reference reports) and filtering mechanism or component (using $\hat{N}$ filtering reports) that minimize the expected cost is now defined as follows:

LP 4

$$\min \sum_{j=1}^{M} Pr[s_j] \left( \sum_{a_k \in S(N)} Pr[a_k | s_j] \tau(s_j, a_k) \right);$$

$$\text{s.t.} \sum_{a_k \in S(N)} Pr[a_k | s_j] (\tau(s_j, a_k) - \tau(s_h, a_k)) > \hat{\Delta}(s_j, s_h);$$

$$\forall s_j, s_h \in S, s_j \neq s_h,$$

$\hat{\Delta}(s_j, s_h)$ is defined in (4);

$$\sum_{a_k \in S(N)} Pr[a_k | s_j] \tau(s_j, a_k) > C; \forall s_j \in S$$

$$Pr[\theta] < Pr[\theta | s_j] \Rightarrow Pr[\text{drop } s_j | \theta] < \gamma; \forall \theta, \forall s_j$$

$$\tau(s_j, a_k) \geq 0, \pi(s_j, \hat{a}_k) \in [0, 1] \forall s_j, \forall a_k, \forall \hat{a}_k;$$

The effect of using probabilistic filtering of reports was experimentally studied on 500 randomly generated settings, for different number of filtering reports (i.e., $\hat{N}$), different number of quality signals (i.e., M) and different values of the parameter $\gamma$. FIG. 7(a) and 7(b) plot the tradeoff between cost reduction (i.e. the ratio between the optimal cost without probabilistic filtering and the optimal cost with probabilistic filtering) and information loss for M=3 and M=5 quality signals. When M=3 and to lose 2% of the useful reports is accepted, the cost decreases 6 times by using $\hat{N}$=2 filtering reports and 12 times by using $\hat{N}$=8 filtering reports. As intuitively expected, the cost decreases when more filtering reports can be used and higher probabilities of losing useful feedback can be accepted.

As a next experiment, the accuracy of the reputation information published by a mechanism that filters out reports is reviewed. For each of the random settings generated above, 200 random sequences of 20 feedback reports is generated corresponding to a randomly chosen type. For different parameters (i.e., number of signals, M, number of filtering reports, $\hat{N}$ and threshold probability $\gamma$), FIGS. 8(a)-8(d) plot the mean square error of the reputation information[1] published by a mechanism 30 that filters and doesn't filter submitted reports, respectively. As expected, filtering out reports does not significantly alter the convergence of beliefs; on the contrary, filtering out reports may sometimes help to focus the beliefs on the true type of the product.

[1] The mean square error after i submitted reports is defined as: $\epsilon_i = \Sigma_\theta \epsilon_\Theta (Pr[\theta\backslash i] - I(\theta))^2$, where $Pr[\bullet\backslash i]$ describes the belief of the agents regarding the type of the product after i submitted reports, $I(\theta)=1$ for $\theta=\theta^*$ (the true type of the product), and $I(\theta)=0$ for $\theta \neq \theta^*$.

D6. Robustness to Imperfect Information.

Incentive-compatible payment schemes are computed based on prior knowledge about the provider 20 (expressed through the conditional probabilities $Pr[s_j|s_i]$). When this information may contain small errors, it is important to derive payments that are incentive-compatible for a range of possible prior information.

For this case, $\hat{Pr}[\square|\square]$ shall denote the unknown conditional probabilities, that, however, are not too far from some estimates $Pr[\square|\square]$ that the RM 30 possesses. $L_2$ is taken as the norm to measure distance, and the distance between $\hat{Pr}[\square, \square]$ and $Pr[\square,\square]$ is bound to at most $\epsilon$:

$$\sum_{s_i \in S} (Pr[s_j | s_i] - \hat{Pr}[s_j | s_i])^2 \leq \epsilon; \forall s_i \in S;$$

The incentive compatible constraints of the linear optimization problems defining the optimal payments must now be satisfied for all possible prior information:

$$\sum_{k=1}^{M} \hat{Pr}[s_k | s_j](\tau(s_j, s_k) - \tau(s_h, s_k)) > \Delta(s_j, s_h); \quad (7)$$

$$\sum_{k=1}^{M} \hat{Pr}[s_k | s_j] \tau(s_j, s_k) > C;$$

for all $\hat{Pr}[s_k | s_j]$ such that:

$$\sum_{s_k \in S} (Pr[s_k | s_j] - \hat{Pr}[s_k | s_j])^2 \leq \epsilon; \forall s_j \in S;$$

or consequently:

$$\min_{\hat{Pr}[\cdot|s_j]} \left( \sum_{k=1}^{M} \hat{Pr}[s_k | s_j](\tau(s_j, s_k) - \tau(s_h, s_k)) \right) > \Delta(s_j, s_h);$$

$$\min_{\hat{Pr}[\cdot|s_j]} \left( \sum_{k=1}^{M} \hat{Pr}[s_k | s_j] \tau(s_j, s_k) \right) > C;$$

The above minimization problems are convex, and therefore solvable in polynomial time. By replacing equation (7) in all linear optimization problems defined earlier in this section, the optimal payment schemes are obtained that are also robust to imperfect information.

E. Undesired Equilibria.

Many payment-based incentive-compatible RMs 30 have several other equilibria besides the incentive-compatible one. (See for example, An "Incentive-Compatible Reputation Mechanism," Jurca and B. Faltings, In *Proceedings of the IEEE Conference on E-Commerce,* Newport Beach, Calif., USA, 2003R; "Minimum Payments That Reward Honest Reputation Feedback," R. Jurca and B. Faltings, In *Proceedings of the ACM Conference on Electronic Commerce,* Ann Arbor, Mich., USA, Jun. 11-15 2006; "Eliciting Informative Feedback; The Peer-Prediction Method," N. Miller, P. Resnick, and R. Zeckhauser. *Management Science,* 51:1359-1373, 2005.). The contents of these articles are incorporated by reference herein. Such RMs 30 all accept constant reporting strategies (i.e., always reporting the same signal) as Nash equilibria. Moreover, at least one of the constant reporting equilibria gives the reporters a higher payoff than the honest one.

The presence of several Nash equilibria is a serious impediment for the implementation of incentive compatible RMs 30. When rational clients 10 are faced with several equilibrium strategies, it cannot be predicted which strategy will be chosen. Truth-telling can emerge as an equilibrium, but so can any other lying strategy. Human users have a natural predisposition towards being honest; they will expect some clients 10 to unconditionally report the truth, and this facilitates the coordination of all clients 10 on the honest reporting strategy.

However, in a market dominated by rational agents that have been programmed to maximize a user's revenue, the same assumptions can no longer be made. Out of several equilibria, rational reporters are expected to choose the one that yields the highest payoff. Unfortunately, the highest paying equilibrium may well be a dishonest one.

E1. Using Trusted Reports.

Lying equilibria can be eliminated when the RM 30 has some reports that are guaranteed to be true with high probability. Such trusted reports can be obtained from specialized agents that interact with the service provider 20 for the sole purpose of rating the service. The method is well known for the hotel and restaurant industries where specialized reviewers pose as normal clients 10 in order to rate the quality of a restaurant or a hotel.

Given that specialized reporters are not treated preferentially (they cannot be identified by service providers 20), the mechanism 30 can use the trusted reports as reference reports for all other submitted feedback. Since trusted reports are true, normal clients 10 believe that they are being scored (and paid) against a truthful reporter. Honesty thus becomes the only equilibrium strategy.

From a game theoretic point of view, one trusted report for every round is enough to enforce honest reporting. All other reports are compared to the trusted report. Therefore, no client 10 has the incentive to misreport. However, this procedure creates strong misbehavior incentives for the RM 30 itself. By faking the value of the trusted report, or by strategically choosing one of several available reports, the RM 30 can significantly reduce the payments to the clients 10. The misbehavior of the mechanism cannot be detected unless some party is able to verify all trusted reports received by the mechanism.

Dealing with selfish RMs 30 is a complex problem in itself, and will not be discussed herein. However, any trustworthy implementation of a RM 30 must ensure three properties:
integrity of submitted reports;
traceable rules for assigning reference reports;
upper limits on the number of times a reference report can be used.

The first can be addressed by digital signatures and prevents the mechanism 30 (or anybody else) to modify the content of submitted information. Agents use their private keys to digitally encrypt submitted feedback messages. See "An Incentive-Compatible Reputation Mechanism," cited above. Any other agents can read the feedback, but nobody can modify the content without being detected.

The second property prevents the RM 30 to manipulate the choice of reference reports, without being eventually disclosed. Technical solutions can be envisaged based on secure multi-party computation protocols. See http://www.wisdom.weizmann.ac.il/~oded/pp.html, O. Goldreich, Secure multiparty computation.1998, the entire contents of which are incorporated by reference herein.

Finally, the third property ensures that RMs 30 do not have the incentive to throw away available reports and buy new ones. Setting the limit to $$\rho = \frac{C_T}{\Box \text{maxr}(\because)\Box}$$

(where $C_T$ is the cost of a trusted report), the most optimistic payment saving obtained from purchasing a fresh trusted report is always smaller than the cost of the report.

It must be then determined how many trusted reports should the RM 30 purchase in every round to ensure that rational clients 10 report honestly. The answer depends on two points or observations. First, it is not necessary to always score a normal report against a trusted one. In most settings it is enough to have a trusted report as a reference report with some probability $\omega<1$. $\omega$ should be such that the "threat" of a true reference report is high enough to render lying strategies unattractive.

Second, the threshold value of $\omega$ will depend on how strict truth telling is enforced. Making honest reporting the only NEQ strategy requires more trusted information than making it the highest paying equilibrium. Depending on the application, one option or the other should be chosen. In the remaining part of this discussion, the minimum threshold value $\omega$ for both cases will be computed.

Consider the client i that observes the signal $s_j$ and uses the equilibrium reporting strategy a. When the RM 30 uses a trusted reference report with probability $\omega$ (and a "normal" reference report with probability $1-\omega$), the expected payoff to i is:

$$V_\omega(\alpha, \alpha | s_j) = \omega V(\alpha, \overline{\alpha} | s_j) + (1-\omega) V(\alpha, \alpha | s_j);$$

The reporting strategy a continues to be a Nash equilibrium if and only if for all other reporting strategies a', and all possible signals $s_j$, $$V_\omega(\alpha', \alpha | s_j) + \Delta(s_j, \alpha'_j) < V_\omega(\alpha, \alpha | s_j) + \Delta(s_j, a_j);$$

The higher the value of $\omega$, the less likely that $a \neq \overline{n}$ remains a NEQ. When $\omega=1$, the honest reporting strategy, $\overline{n}$, remains by definition the only NEQ. Finding the minimum threshold value such that all lying NEQ strategies are eliminated requires solution to the following problem:

Problem 1 Find the minimum $\omega^* \in [0,1]$ such that for all $\omega$, $\omega^* \leq \omega \leq 1$, for all lying reporting strategies $a \neq \overline{\alpha}$, there is a signal $s_j \in S$ and a strategy $a' \neq a$ such that $V_\omega(\alpha, \alpha | s_j) + \Delta(s_j, a_j) < V_\omega(\alpha', \alpha | s_j) + \Delta(s_j, a'_j)$ Alternatively, finding the minimum threshold value such that all lying NEQ strategies generate strictly lower payoffs than the honest reporting strategy involves solving the problem:

Problem 2 Find $\omega = \min(\omega)$, s.t. $f(\omega) = 0$, where $$f(\omega) = \max_{a, s_j}(V_\omega(a, a | s_j) + \Delta(s_j, a_j) - V(\overline{a}, \overline{a} | s_j));$$

and a is a NEQ: i.e. $V_\omega(a, a | s_k) + \Delta(s_k, a_k) \geq V_\omega(s_i, a | s_k) + \Delta(s_k, s_i)$ for all $s_i, s_k \in S$.

Problem 2 above contains two nested optimizations: (1) finding the Nash equilibrium strategy that generates the highest payoff and (2) finding the minimum value of $\omega$ (i.e. $\omega^*$) where the highest Nash equilibrium payoff corresponds to the incentive-compatible reporting strategy. Finding the highest Nash equilibrium payoff is a NP-hard problem (See Complexity Results about Nash Equilibria. V. Conitzer and T. Sandholm,". In *Proceedings of the IJCAI*, Acapulco, Mexico, 2003, the contents of which are incorporated by reference herein). On the other hand, the function $f(\omega)$ is decreasing, and therefore, a binary search can be used to find the minimum value of $\omega$. Note that the solutions to Problem 2 also represent lower bounds for the solutions of Problem 1.

It is important to minimize the cost of enforcing honesty by minimizing the total payments (i.e., both to normal and specialized reporters) made by the RM 30. $\omega^*$ (computed by Problem 1 or 2) shall be the minimum probability that a trusted report is chosen by the mechanism 30 as a reference report for every submitted feedback reports in the present round. When N is the number of clients 10 that have submitted feedback and $$\rho = \frac{C_T}{\Box \max \tau(\because)\Box}$$

is the maximum number of times the same trusted report can be used as a reference report, the total number of purchased trusted reports is:

$$N_T = \left\lceil \frac{N \cdot \omega^*}{\rho} \right\rceil$$

Or, the expected payment made to a truthful client (the expectation is considered at the beginning of the round when reports are not known yet) is:

$$W = E_{s_j} \in s[V(\overline{a}, \overline{a}|s_j)] = \sum_{j=1}^{M} Pr[s_j] \left( \sum_{k=1}^{M} Pr[s_k|s_j] \tau(s_j, s_k) \right);$$

which gives the total cost of enforcing honesty for one round:

$$TC = N \cdot W + N_T \cdot C_T$$

Given the prior understanding (i.e., the conditional probabilities $Pr[s_k|s_j]$) and an accurate estimation of the total number of clients 10 for that round, the RM 30 may choose incentive-compatible payment scheme $\tau(\Box,\Box)$ that minimizes its total cost:

LP5

$$\min(N \cdot W + N_T \cdot C_T);$$

$$s.t. \sum_{k=1}^{M} Pr[s_k|s_j](\tau(s_j, s_k) - \tau(s_h, s_k)) > \Delta(s_j, s_h),$$

$$\forall s_j, s_h \in S, s_j \neq s_h$$

$$\sum_{k=1}^{M} Pr[s_k|s_j] \tau(s_j, s_k) > C;$$

$$\forall s_j \in S$$

$$\tau(s_j, s_k) \geq 0; \forall s_j, s_k \in S,$$

$\omega^*$ solves Problem 1 or 2

E2. Payments That Depend on the Information Provided by a Report.

Another method for eliminating undesired equilibria in a feedback reporting setting is to build payments that also depend on the quantity of information provided by a report. $\tau(s_i,s_j)$ directly depends on the impact of the report $s_i$ on the reputation of the provider 20:

a if the report $s_i$ will greatly change the reputation of the provider 20, the report brings new, potentially interesting information, and therefore should be rewarded more;

if the report $s_i$ will insignificantly change the reputation of the provider 20, it doesn't bring anything new, and should therefore be paid much less (up to no payment at all);

Such payments immediately eliminate constant reporting strategies. Reports that fully agree with previous clients 10 do not bring any new information about the reputation of the provider 20, and therefore are not rewarded by the RM 30.

In a system where payments for reports are directly proportional to the new information brought by the report, lying equilibrium strategies require complex synchronization between colluding reporters. The malicious clients 10 must synchronize their reports such that every false report brings sufficient change to the reputation of the provider 20. To prevent such synchronized strategies to occur, the RM 30 can bring in random decisions as to ordering the sequence of received reports.

F. Collusion Among Clients.

The existence of several reporting equilibria also raises the question of how difficult it is for a group of colluding clients 10 to switch the reporting equilibrium. Consider the lying equilibrium strategy $a \neq \overline{a}$. Rational clients 10 can be convinced to switch to the reporting strategy a (instead of honestly reporting), only when the fraction, $\delta$, of clients 10 colluding on a is so high that:

$$\delta V(a, \alpha|s_j) + (1-\delta)V(a, \overline{a}|s_j) + \Delta(s_j, a_j) > \delta V(\overline{a}, \alpha|s_j) + (1-\delta)V(\overline{a}, \overline{a}|s_j), \forall s_j \in S;$$

This gives:

$$\delta = \max_{s_j \in S} \frac{V(\overline{a}, \overline{a}|s_j) - V(a, \overline{a}|s_j) - \Delta(s_j, a_j)}{V(a, a|s_j) - V(\overline{a}, a|s_j) + V(\overline{a}, \overline{a}|s_j) - V(a, \overline{a}|s_j)};$$

as the critical coalition size. The most profitable equilibrium reporting strategy is the easiest to impose, as it requires the minimum group of deviators.

In most practical settings, the group of colluders required to shift from the honest reporting equilibrium is quite high. This opens new opportunities for the efficient operation of RMs. A group of clients 10 synchronized on the honest reporting strategy tend to keep reporting the truth as long as no significant group of colluders wishes to shift the equilibrium. This property can be exploited by mechanism operators to reduce the running cost of the mechanism 30. Trusted reports should be used whenever new services enter the market. After several rounds, the mechanism 30 can stop purchasing trusted reports, knowing that the clients 10 continue to report honestly. Active enforcement should be resumed only when the mechanism 30 has strong reasons to believe that a significant coalition tries to shift the equilibrium.

The asynchronous involvement of the RM 30 is also advantageous from a practical perspective. When entering the market, service providers 20 typically have less clients 10. The mechanism 30 therefore needs few trusted reports to install the honest equilibrium. As the customer base of the provider 20 increases, new clients 10 will adopt the norms already existing in the market and report the truth.

Optimal payments are now computed that secure a certain lower bound on the smallest coalition that can shift the reporting equilibrium. Given the desired lower bound $\delta$, the prior belief and the conditional probabilities $Pr[s_k|s_j]$, the RM 30 should use the payment scheme that solves the following optimization problem:

$$\min W$$

$$s.t. \sum_{k=1}^{M} Pr[s_k|s_j](\tau(s_j, s_k) - \tau(s_h, s_k)) > \Delta(s_j, s_h),$$

$$\forall s_j, s_h \in S, s_j \neq s_h$$

$$\sum_{k=1}^{M} Pr[s_k|s_j] \tau(s_j, s_k) > C;$$

$$\forall s_j \in S$$

-continued $$V(\bar{a}, \bar{a}|s_j) - V(a, \bar{a}|s_j) - \Delta(s_j, a_j) >$$
$$\delta(V(a, a|s_j) - V(\bar{a}, a|s_j) + V(\bar{a}, \bar{a}|s_j) - V(a, \bar{a}|s_j)),$$
$$\forall s_j \in S, \forall a;$$
$$\tau(s_j, s_k) \geq 0; \forall s_j, s_k \in S;$$

The first two constraints are the incentive-compatible conditions, while the third enforces the lower bound, δ. The optimization problem is linear in the payments τ(□,□), and can be solved efficiently.

The methods of this section can be easily combined with the techniques described in Sections D4 and D5. Namely, the reputation mechanism can filter out some of the reports, or can use payments that depend on several reference reports. The combination of several methods will reflect in the set of constraints of the optimization problem that defines the payment mechanism.

Figure 9:
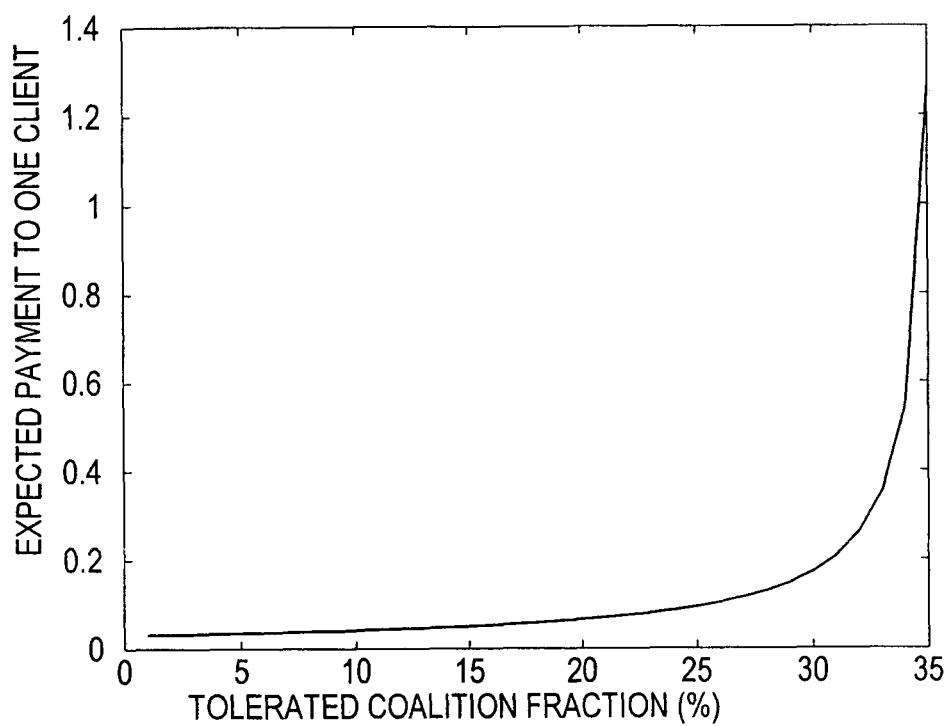
FIG. 9 is a plot of the tradeoff between cost and tolerated coalition size.

For some typical values, the tradeoff between cost (i.e., expected payment for a truthful report) and tolerated coalition size is plotted in FIG. 9.

F1. Addressing Different Types of Collusion.

Several other scenarios of collusion can be addressed. First, an extension of the scenario in Section F is considered, by assuming that all reporters collude, but that they can only choose the same reporting strategy. Such a scenario may appear when all agents have access to a trusted source of information (a public web-page, the analysis of an expert, etc) that advises them on a (common) reporting strategy.

The lack of coordination between colluders considerably simplifies the design problem. The constraints on the incentive-compatible payment mechanism must ensure that none of the pure symmetric strategy profiles (all agents report the same thing) is a Nash Equilibrium.

The set of pure strategies is finite. Therefore the constraints that prevent the existence of lying equilibria can exhaustively be written. Since agents cannot transfer payments from one another, the constraints on the payments should simply provide incentives for deviating from the collusion strategy. For example, when the set of signals contains only two elements, ($s_1$, or the "negative" signal and $s_2$, or the "positive" signal), the supplementary constraints are the following:

always reporting the negative signal ($s_1$) is not NEQ:

$$\tau(s_2, \text{all}(s_1)) > \tau(s_1, \text{all}(s_1));$$

A rational agent would rather report $s_2$ instead of $s_1$ if all other agents report $s_1$;

always reporting the positive signal ($s_2$) is not NEQ:

$$\tau(s_1, \text{all}(s_2)) > \tau(s_2, \text{all}(s_2));$$

A rational agent would rather report $s_1$ instead of $s_2$ if all other agents report $s_2$;

always lying is not NEQ when:

either $V(s_1, \text{all}(\text{lie})|s_1) > V(s_2, \text{all}(\text{lie})|s_1);$ or $V(s_2, \text{all}(\text{lie})|s_2) > V(s_1, \text{all}(\text{lie})|s_2);$ A rational agent expects a higher payment either by truthfully reporting $s_1$, or by truthfully reporting $s_2$;

Note that a payment mechanism that satisfies the above constraints (besides the general incentive-compatibility constraints from LP 3) does not require any trusted information.

A second extension of the scenario presented in Section F is to assume that the fraction of colluders can coordinate their reports on different strategies (every colluder could pick a different strategy). The remaining fraction of agents is assumed to report the truth. However, honest reports are not identifiable by the reputation mechanism (as trusted reports were).

Given that N−k agents report honestly, the constraints on the incentive-compatible payments can be written such that any of the remaing k colluders has the incentive to report the truth, regardless of the reports of the other coalition members (i.e., honest reporting is a dominant strategy among colluders). For the same binary case (the quality signals are $s_1$ and $s_2$), let n be the number of $s_2$ signals reported by the N−k honest reporters, and, let c be the number of $s_2$ signals reported by the other k−1 colluders. Honest reporting is a dominant strategy if and only if:

$$\sum_{n=0}^{N-k} Pr[n|s_1](\tau(s_1, n+c) - \tau(s_2, n+c)) \geq \delta;$$

$$\sum_{n=0}^{N-k} Pr[n|s_2](\tau(s_2, n+c) - \tau(s_1, n+c)) \geq \delta;$$

for all integers $c \in \{0, \ldots, k-1\}$.

The above system of inequalities is feasible when less than half of the agents collude (i.e., k<N/2).

Last, but not least, the scenario in Section F is extended with the assumtion that colluding agents can redistribute the revenues among themselves. This will typically be the case when the same strategic agent controls a number of fake online identities (or "sybils"). From the agent's perspective, the individual revenues obtained by each sybil is irrelevant; the objective of the agent is to maximize the cumulated revenue obtained by all sybils.

The fact that utilities are transferable, makes the problem of the mechanism designer significantly harder. In all previous scenarios, the constraints that made an incentive-compatible mechanism collusion resistant ensured that lying coalitions are unstable. That is, at least one of the colluders is better off by deviating from the colluding strategy. However, in this context the agents that suffer from following the colluding strategy may be rewarded by the others. The necessary (and sufficient) condition for collusion resistance requires that the cummulated revenue of the coalition is maximized when reporting the truth.

Concretely, a payment mechanism with the following property is desired: whenever k colluding agents observe c positive signals, their cummulated revenue is maximized when reporting c positive reports (given that the other N−k agents are reporting honestly). The revenue of the coalition that reports r (out of k) can be computed as follows. The r colluders that report positive signals (i.e., $s_2$) are rewarded $\tau(s_2, r-1+n)$, while the k−r colluders that report negative signals (i.e., $s_1$ are rewarded $\tau(s_1, r+n)$; n is the number of positive reports submitted by the honest reporters. The expected revenue of the coalition is therefore:

$$V(r|c) = \sum_{n=0}^{N-1} Pr[n|c](r \cdot \tau(s_2, r-1+n) + (k-r) \cdot \tau(s_1, r+n));$$

where Pr[n|c] is the probability that n out of N−k agents observe positive signals (i.e., $s_2$), given that c out of k positive signals have already been observed.

Honest reporting is the best strategy for the coalition, when for all c ∈ {0, . . . ,k}, arg max$_r V$(r|c)=c:

$$\sum_{n=0}^{N-1} Pr[n|c](c \cdot \tau(s_2, c-1+n) + (k-c) \cdot \tau(s_1, c+n) - r \cdot \tau(s_2, r-1+n) - (k-r) \cdot \tau(s_1, r+n)) \geq \delta;$$

The cheapest incentive-compatible, collusion resistant payment mechanism minimizes the budget under the linear constraints mentioned above.

The extension of the above examples to the case where M signals can be observed (and reported) is straight-forward.

F2. Detect the Formation of Lying Coalitions.

Coalition detection algorithms can be based on the statistical analysis of the submitted reports. Dangerous lying coalitions introduce noticeable deviations in the distribution of feedback reports recorded in one round and can therefore be detected.

Given N reports submitted in one round, the hypothesis of the RM 30 is that α% of them follow a collusion strategy a. The honest reports (i.e., N(1−α) reports) follow the probability distribution defined by the true type, θ of the service. The colluding reports (i.e., Nα reports) follow the probability distribution:

$$\bar{f}(s_j|\theta) = \sum_{k,a_k=s_j} f(s_k|\theta);$$

Knowing the true type of the service, θ, and the colluding strategy a, the RM 30 can compute the value of α that maximizes the likelihood of obtaining the N recorded reports:

$$\alpha^*|\theta = \max_{\alpha \in [0,1]} Pr[\text{observing exactly the recorded reports }[\theta, \alpha, a]; \quad (8)$$

The set of possible candidates for a can be restricted by considering only the lying strategies that are the most profitable to colluders.

Because the RM 30 does not precisely know the true type θ of the service, it will use its prior understanding (i.e., the probabilities Pr[θ] that the true type of the service is θ) to weigh the different values of α resulting from equation (8). Now, the function g: Θ→[0,1] shall define the most likely value of α for every possible service type:

$$g(\theta) = \max_{\alpha \in [0,1]} Pr[\text{observing exactly the recorded reports }[\theta, \alpha, a];$$

The best approximation for the value of α can then be computed as:

$$\alpha^* = \sum_{\theta \in \Theta} g(\theta) \cdot Pr[\theta];$$

It is important to note that the precision of the detection algorithm can be fine-tuned by the RM 30 through trusted reports. Depending on the probability distribution given by the prior understanding, the mechanism operator can decide to buy another $N_T \ll N$ trusted reports in the given round. These trusted reports are used to update the probability distribution over possible types. A small number of trusted reports (5 to 10) can efficiently focus the belief on a certain type, which allows better estimates for the value of α.

This flexibility is particularly important in markets where the number of clients 10 in one round is high. Actively enforcing the honest strategy in such environments is expensive since it requires many trusted reports. Before taking the decision to start using trusted reference reports, the mechanism operator can first buy a few of them and use them to get a better approximation of the size of the coalition.

G. Examples.

G1. Information Services.

Consider a web service providing closing stock quotes. A reputation-based SLA is advertised every morning and specifies the price of service, the QoS (e.g. the quote is obtained within 5 minutes of the closing time with probability $\bar{q}$) and the penalty function λ. Interested clients 10 request the service and then wait the answers from the service provider 20. They experience high quality if the answer is received before the deadline (i.e. 5 minutes after the closing time) or low quality if the answer is late or not received.

Figure 10:
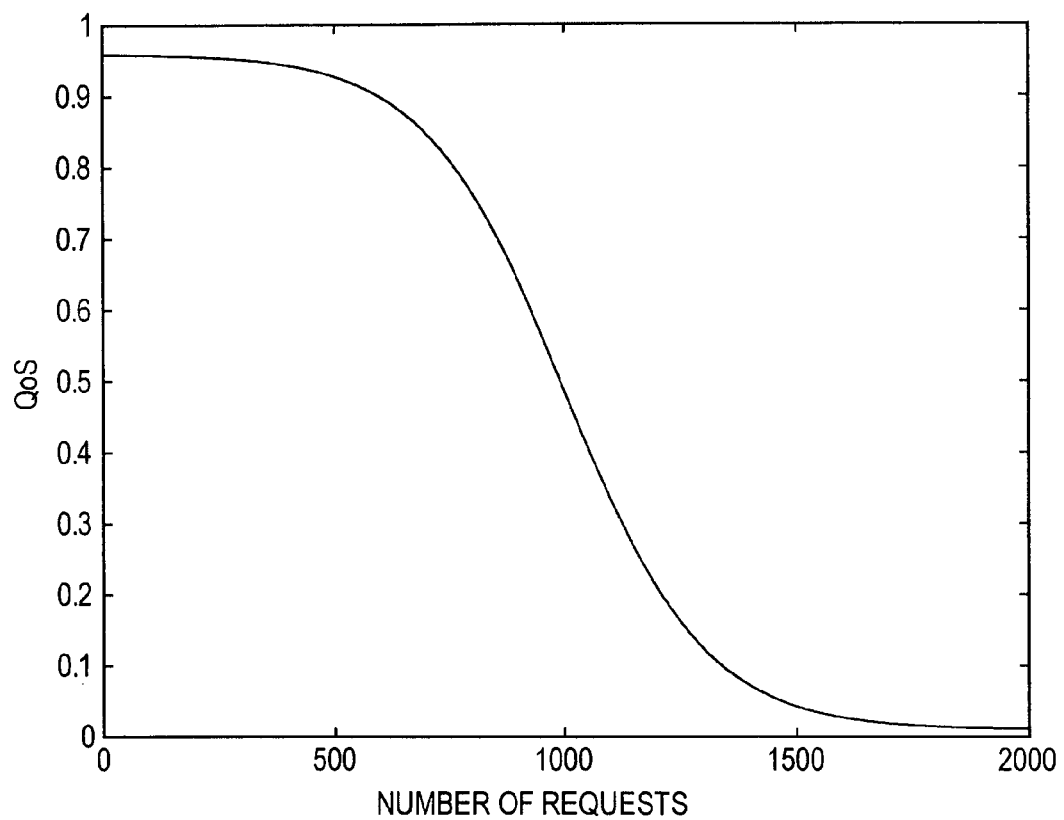
FIG. 10 is a plot of the relation between the expected quality of service (QoS) and the number of expected requests accepted by a service provider.

The probability of successfully answering the clients' requests depends on the available infrastructure and on the number of accepted requests. For a given provider 20, FIG. 10 plots the relation (experimentally determined) between the expected QoS (i.e. q(n)) and the number of accepted requests. The QoS actually provided to the clients 10 is normally distributed around q(n) with variance $\sigma_n^2$.

Closing stock quotes represent mission-critical information for the clients 10. Therefore, late or absent information attracts supplementary planning costs and lost opportunities. The market price function, (i.e. u(q)) is assumed convex, corresponding to risk-averse clients 10. When $\bar{q}$ is the advertised QoS, n is the number of accepted requests, $\hat{q}$ is the QoS perceived by the market, and C denotes the fixed costs, the expected revenue of the service provider 20 is:

$$V(n, \bar{q}) = E_{\hat{q}}[n \cdot (u(\hat{q}) - \lambda(\bar{q}, \hat{q}) - C];$$

Figure 11:
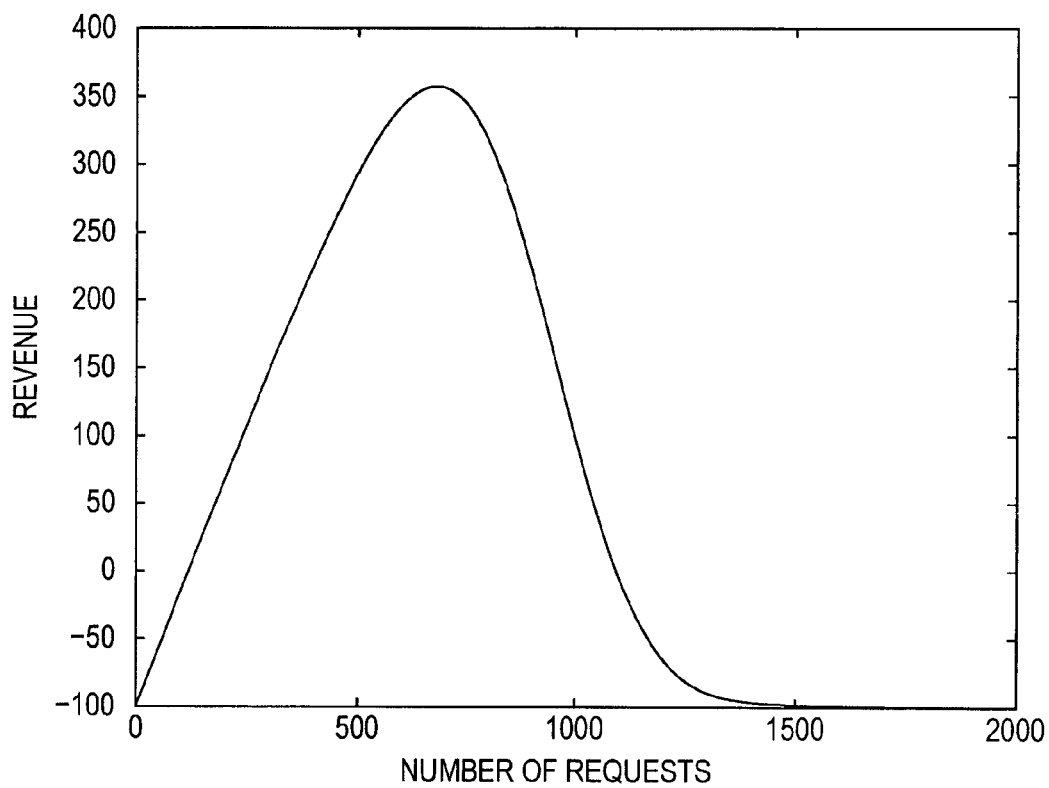
FIG. 11 is a plot of the revenue function of the service provider depending on the number of accepted requests.

The market perceives a QoS equal to: $\hat{q} = \phi(n) + \eta_n + \eta_r$ where $\eta_r$ is the noise introduced by reporting mistakes, normally distributed around 0 with variance $\sigma_r^2$. For a price function $u(q) = q^2$, the fixed cost C=100, the standard deviations $\sigma_n = 3\%$, $\sigma_r = 4\%$, and a penalty function $\lambda(\bar{q}, \hat{q}) = 2(p(\bar{q}) - p(\hat{q}))$, FIG. 11 shows the optimal revenue of the provider 20 as a function of n. The optimal value of the payoff function is reached for $n_r = 681$, when $\bar{q} = 0.858 = \phi(681)$, i.e. providers 20 deliver the QoS they declared.

The mechanism described above ("mechanism A") is compared with an alternative mechanism ("mechanism B") where the market only uses trusted reports (i.e. independent monitoring) to compute the penalty to service providers for QoS degradation.

Figure 12:
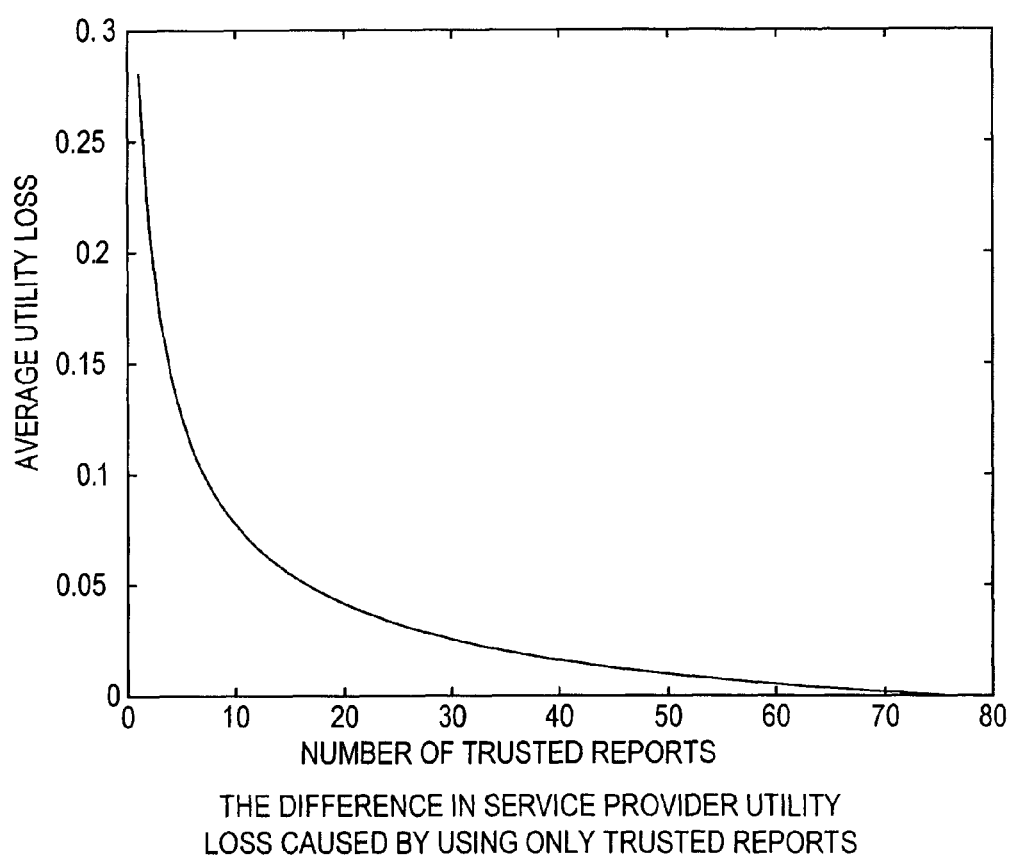
FIG. 12 is a plot of the difference in service provider utility loss caused by using only trusted reports.

The average, per-client, utility loss of a service provider 20 is defined as the expected penalty a provider 20 has to pay as a consequence of an inaccurate approximation of the delivered QoS (as computed by the monitoring mechanisms). When $\hat{q}_A$ and $\hat{q}_B$ are the monitored QoS values provided by the two mechanisms, the utility losses caused by the two mechanisms are:

$$\text{UtilLoss}_A = E_{\hat{q}_A}[\lambda(\bar{q}, \hat{q}_A)]; \text{UtilLoss}_B = E_{\hat{q}_B}[\lambda(\bar{q}, \hat{q}_B)];$$

computed at the optimal QoS, $\bar{q}$. A higher variance of $\hat{q}$ increases the utility losses of providers 20. Typically, mechanism B has less information than mechanism A about the delivered QoS and therefore generates higher losses for providers 20. The difference in the average utility loss per client generated by the two mechanisms is shown in FIG. 12, as a function of the number of trusted reports employed by mechanism B. To reach the same performance, mechanism B needs approximately 75 trusted reports, i.e. 11% of the number of service requests.

The administrative costs of the mechanism A consist of (a) the reputation side-payments and (b) the cost of trusted reports. The cost of mechanism B consists only of trusted reports. The cost of a trusted report is assumed equal to $(1+\rho)$ times the price of service (e.g. the monitoring agent buys the service and receives a commission $\rho$). We take $\rho=0.1$.

Figure 13:
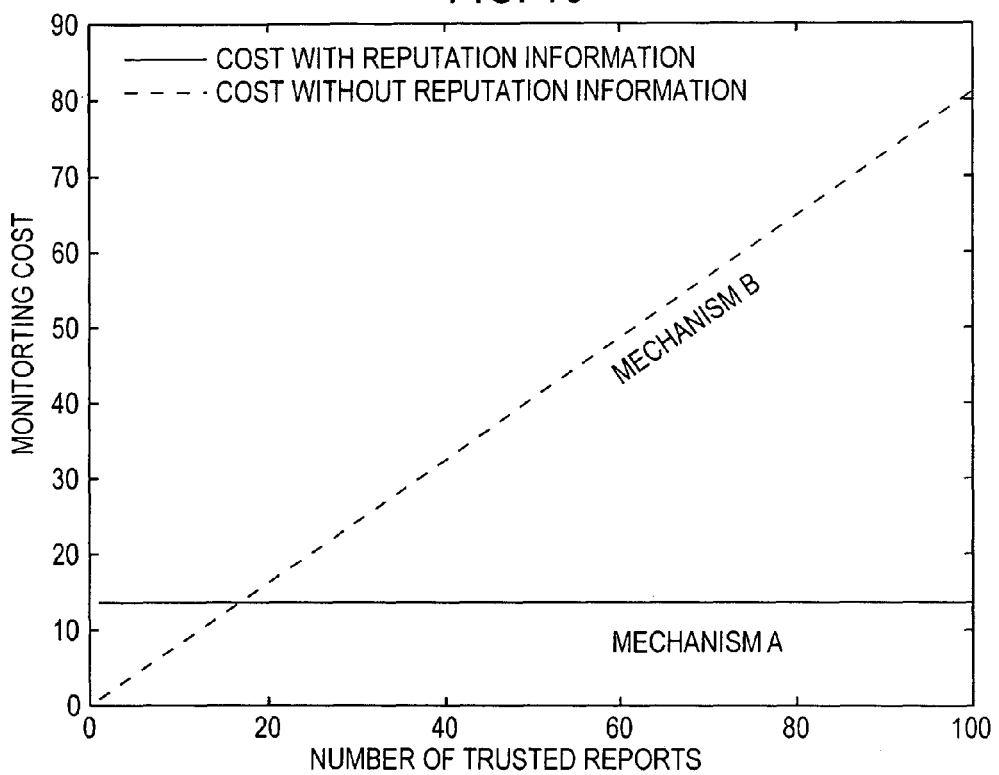
FIG. 13 is a plot of the monitoring cost of not using reputation information by the number of trusted reports.

For the above values, one incentive-compatible payment scheme is the following: $\tau(1,1)=2.3\%, \tau(0,1)=0, \tau(1,0)=1.6\%$ and $\tau(0,0)=1.7\%$ of the price of service. FIG. 13 illustrates the difference in monitoring costs between the mechanisms A and B for different number of trusted reports employed by mechanism B. For similar performance (i.e. 75 trusted reports) mechanism B has monitoring costs that are 4 times higher.

Note that the utility loss in FIG. 12 is for every client. When mechanisms A and B have the same monitoring cost (i.e. mechanism B uses approximately 20 trusted reports), a service provider 20 loses on the average approx. 4.5% more utility for every customer as a consequence of not using reputation-based monitoring. This apparently insignificant amount, multiplied by the number of total clients 10 (i.e. 681), generates significant losses for the provider 20.

G2. Computation Services.

A simple authentication service is considered. The client 10 submits an authentication request (e.g., resource name, user name and password) and the service returns a token that can later be used by valid users to access the resource.

The SLA advertises availability $p_1$ (i.e., the probability that a request is answered before a deadline $t_d$ is $p_1$) and correctness $p_2$ (i.e., the probability of returning the correct answer is $p_2$). The two criteria must be used together since otherwise a service can achieve almost perfect availability by always denying access. Formally, this SLA is expressed as the probability distribution $\pi_1=\{p_1, 1-p_1\}$ for the quality attribute $q_1=$ResponseBeforeDeadline $\in V_1=\{0(\text{false}), 1 (\text{true})\}$, and the probability distribution $\pi_2=\{p_2, 1-p_2\}$ for the quality attribute $q_2=$CorrectAnswer $\in V_2=\{0(\text{false}),1(\text{true})\}$.

A quality observation (and therefore a quality report) is a vector $o=(v_1,v_2)$ where $v_1 \in\{0,1\}$ and $v_2 \in \{0,1,\text{null}\}$. The set of possible signals received by the client is $S=\{s_1=(0,\text{null}), s_2=(1,0), s_3=(1,1)\}$. The maximum benefit a client 10 can obtain by misreporting is $\Delta=0.5$ (all values hereafter are normalized to the price of service, assumed 1).

The payment scheme used by the RM 30 is defined by the four positive amounts $\tau_1(1), \tau_1(0), \tau_2(1)$ and $\tau_2(0)$, paid when the non-null value of $Q_1$ or $Q_2$ matches the corresponding value of the reference report.

One client's belief regarding the value of the reference report changes by at least $\bar{\gamma}=\underline{\gamma}=20\%$ in the direction of the actual observation. The probability that the reference report contains 1 for $q_1$ is: $\Pr_1[1|1]=p_1+(1-p_1)^{\bar{\gamma}}$ if the client also received a response, or $\Pr_1[1|0]=p_1-(1-p_1)^{\bar{\gamma}}$ if the client did not receive a response. Similar equations can be written for the probabilities $\Pr_2[1|1]$ and $\Pr_2[1|0]$ defining the beliefs regarding the value of $q_2$ in the reference report.

When $p_1=p_2=90\%$, the following optimal payments are obtained: $\tau(s_1,s_1)=0.680$, $\tau(s_2,s_2)=0.089$, $\tau(s_2,s_3)=\tau(s_3,s_2)=0.064$ and $\tau(s_3,s_3)=0.289$. The expected cost of the RM 30 for one reporter is 0.081. The payments can be further decreased by up to an order of magnitude using a filtering mechanism or component as described in Section D, "Incentives for Truthful Reporting" above.

G3. Utility Services.

One client is now considered that needs the services of a plumber. The plumber can be either Good (G) or Bad (B): i.e., $\Theta=\{G,B\}$. Since the plumber is listed on the Yellow Pages, the client 10 understands that the plumber is probably good: $\Pr[G]=0.8, \Pr[B]=0.2$. However, even a good plumber can sometimes make mistakes and provide low quality service. Similarly, a bad plumber gets lucky from time to time and provides satisfactory service. A client 10 does not have the necessary expertise to judge the particular problem the client 10 is facing. The client 10 therefore perceives the result of the plumber's work as a random signal conditioned to the plumber's true type. It is assumed that the probability of a successful service (i.e., high quality) is 0.9 if the plumber is good and 0.2 if the plumber is bad (the probabilities of a low quality service are 0.1 and 0.8 respectively).

Considering the prior understanding and the conditional distribution of quality signals, the client 10 expects to receive high quality with probability: $\Pr[h]=1-\Pr[l]=f(h|G)\Pr[G]+f(h|B)\Pr[B]=0.76$. After observing the plumber's work, the client 10 updates her prior understanding regarding the type of the plumber and can estimate the probability that the next client (i.e., the reference reporter) will get satisfactory service: $\Pr[h|h]=1-\Pr[l|h]=0.86$ and $\Pr[h|l]=1-\Pr[l|l]=0.43$.

The client 10 can submit one binary feedback (i.e., l or h) to an online RM 30. Now, the price of the plumber's work shall be fixed and normalized to 1, and the cost of formatting and submitting feedback be $C=0.01$. The client 10 has clear incentives to misreport:

by reporting low quality when she actually received high quality. The client 10 can hope to both decrease the price and increase the future availability of this (good) plumber. Assume that the external benefits of lying can be approximated as $\Delta(h,l)=0.06$.

by reporting high quality when the client actually received low quality. The client 10 can hope to decrease the relative reputation of other plumbers and thus obtain a faster (or cheaper) service from a better plumber in the future. Assume the lying incentive can be approximated as $\Delta(l,h)=0.02$.

The optimal feedback payments equal to: $\tau(h,h)=0.086, \tau(l,l)=0.1, \tau(h,l)=\tau(l,h)=0$. The expected payment to a truth-telling client is 0.07 (i.e., 7% of the price of the service) for the RM 30.

G4. Telecom Services.

Similar to the previous examples, our system can also be used for telecom providers (e.g., phone or internet services). Clients 10 sign a contract with the provider 20 that sets threshold (or typical) values for the QoS attributes (e.g., bandwidth, delay, availability, etc.). To deliver the promised service to the clients 10, the provider 20 must limit the number of simultaneous clients 10 and provision enough resources to the infrastructure.

Monitoring code is already installed in consumer terminal (i.e., mobile phones and modems already have the hardware and software capabilities of monitoring traffic). Clients 10 normally send feedback reports containing continuous values about the monitored quality attributes (e.g., bandwidth or delay). However, the RM 30 can make discrete reported values automatically based on the terms of the contract:

if the contract specifies only threshold values, continuous feedback reports become binary reports; the provider 20 fulfilled or not the contracted value;

if the contract specifies typical values (with or without threshold values), continuous values are categorized into classes (intervals) of values that are approximately equivalent to normal users.

One particularity of this example is that the honest reporting strategy is already installed in client terminals. Tempering with the default (i.e. honest) reporting strategy requires effort and involves a cost (e.g., updating the firmware of the phone or the modem requires special cables, software, knowledge, etc). This cost diminishes lying incentives and contributes to significantly decreasing the payments made for reporting.

G5. Hotel Bookings.

One hotel has several rooms that offer exactly the same accommodation conditions. The quality of the hotel is judged by taking into consideration a number of criteria, e.g. the level of noise, cleanliness, food, location, available facilities, the professionalism of the staff, etc. For every attribute we assume a 5 stars rating scale that is common to most feedback forms available to clients 10 when they check-out.

The particularity of this example is that quality attributes can be considered independent for most practical purposes: e.g., the rating for the food is independent from the rating for location. Some dependencies do exist, (e.g. the level of noise could in general be higher for hotels that are close to major roads). However, they are usually weak enough to be safely ignored.

The independency among quality attributes allows the design of the RM 30 as a virtual composition of separate RMs 30, one for each attribute. This significantly reduces the complexity of designing optimal payments. Given a 10 quality attribute, each having 5 values, there are $5^{10}$ different reports that clients 10 can submit along the 10 different quality dimensions (the size of the signal set S is $M=5^{10}$). The complexity of the algorithm computing the incentive compatible payments is linear in $M^2$, which for this case is clearly intractable.

However, by considering 10 independent (virtual) RMs 30, each accepting feedback for one quality attribute, computing the payments is on the order of $10 \square 5^2$, a reasonable number.

FIG. 14 is a flowchart of the broad level process steps of a method in accordance with an embodiment of the invention. Specifically, at step 100, an agreement is established involving a service provider 20 for the provision of services. Then, first and second entities submit first and second reports to the RM 30 at step 110. Each report relates to (contains) information concerning the quality of service (QoS) of the service provider 20. Finally, the quality of service (QoS) of the service provider 1 12 is estimated at step 120. This estimation is accomplished by sub-steps 120A and 120B wherein the information from the first and second reports is aggregated, and the aggregated information is compared to the conditions in the agreement. In an embodiment of the present invention, an entity is rewarded for submitting a report.

The foregoing description of the embodiments of the invention has been presented for purposes of illustration and description. It is not intended to be exhaustive or to limit the invention to the precise form disclosed and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto and their equivalents.

We claim:

1. A computer-implemented method for rewarding a client for providing a feedback report in a computer system having a reputation mechanism for monitoring the quality of service of a service provider, the method comprising:
    instantiating the reputation mechanism on the computer system;
    receiving at the reputation mechanism, a first feedback report from a client of the service provider, the feedback report having information relating to the quality of service provided by the service provider to the client;
    selecting randomly at the reputation mechanism, at least two reference reports associated with the service provider from a pool of reports, the reference reports relating to the quality of service provided by the service provider wherein at least one of the reference reports is a second feedback report from another client;
    computing in the reputation mechanism a probabilistic score of the first feedback report by measuring a quality of probability distribution of the at least two reference reports as induced by the feedback report;
    determining, by the computer system, a reliability indicator for the first feedback report as a function of the probabilistic score of the first feedback report;
    determining, by the reputation mechanism, an incentive value associated with the client, wherein the incentive value is indicative of the client's probabilistic economic advantage in falsifying at least some information of the first feedback report; and
    computing, by the computer system, a payment for the client using a function of the reliability indicator, the first feedback report and the at least two reference reports, wherein the function minimizes an expected average payment in accordance with a set of at least two constraints, wherein one of the constraints is that the expected payment for providing a truthful feedback report is higher than that for a non-truthful feedback report by at least a minimum margin that is a function of the incentive value.

2. The method of claim 1 wherein the payment is further determined based upon prior knowledge about the service provider and prior knowledge about a second client that reported the second feedback report.

3. The method of claim 1 wherein the constraints include requiring the payment to be an incentive for a first and a second client to report truthfully.

4. The method of claim 1 wherein the objectives comprise payment optimality with respect to expected budget.

5. The method of claim 1 wherein the objectives comprise payment optimality with respect to worst case budget.

6. The method of claim 1 wherein the objectives comprise payment optimality with respect to margins for lying.

7. The method of claim 1 wherein the objectives comprise payment optimality with respect to risk profile of clients.

8. The method of claim 1 wherein the constraints comprise making honest reporting an equilibrium.

9. The method of claim 1 wherein the constraints comprise making honest reporting the only equilibrium.

10. The method of claim 1 wherein the constraints comprise making honest reporting the most attractive equilibrium.

* * * * *